US008379262B2

(12) United States Patent
Ito

(10) Patent No.: US 8,379,262 B2
(45) Date of Patent: Feb. 19, 2013

(54) METHOD, APPARATUS, AND PROGRAM FOR GENERATING BITMAP DATA

(75) Inventor: Morikazu Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 701 days.

(21) Appl. No.: 12/610,613

(22) Filed: Nov. 2, 2009

(65) Prior Publication Data

US 2010/0123726 A1 May 20, 2010

(30) Foreign Application Priority Data

Nov. 17, 2008 (JP) ................................. 2008-293938

(51) Int. Cl.
*G06K 15/00* (2006.01)
(52) U.S. Cl. .................... 358/1.18; 358/1.1; 358/1.13
(58) Field of Classification Search .................. 358/1.1, 358/1.9, 1.13, 1.18, 400, 401, 448
See application file for complete search history.

(56) References Cited

U.S. PATENT DOCUMENTS

| | | | | |
|---|---|---|---|---|
| 5,600,768 A | * | 2/1997 | Andresen | 345/629 |
| 5,946,451 A | * | 8/1999 | Soker | 358/1.9 |
| 5,991,515 A | * | 11/1999 | Fall et al. | 358/1.15 |
| 6,466,229 B1 | * | 10/2002 | Nagao | 345/621 |

FOREIGN PATENT DOCUMENTS

| | | |
|---|---|---|
| JP | 10-52950 | 2/1998 |
| JP | 2005-063027 | 3/2005 |

* cited by examiner

*Primary Examiner* — Thomas D Lee

(74) *Attorney, Agent, or Firm* — Fitzpatrick, Cella, Harper & Scinto

(57) ABSTRACT

In image processing including a PDL processing in which a display list is generated from PDL data described in a page description language (PDL), and a RIP processing in which bitmap data is generated by rendering the display list, before starting the PDL processing on the PDL data, it is determined to generate a display list with overlap removed in the PDL processing when a prediction of the load on the RIP processing is larger than that on the PDL processing, and to generate a display list without overlap removed when the prediction of the load on the PDL processing is larger than that on the RIP processing. According to the present invention, it is possible to quickly and easily balance the load of PDL processing and the load of RIP processing, thereby realizing efficient pipeline processing.

19 Claims, 21 Drawing Sheets

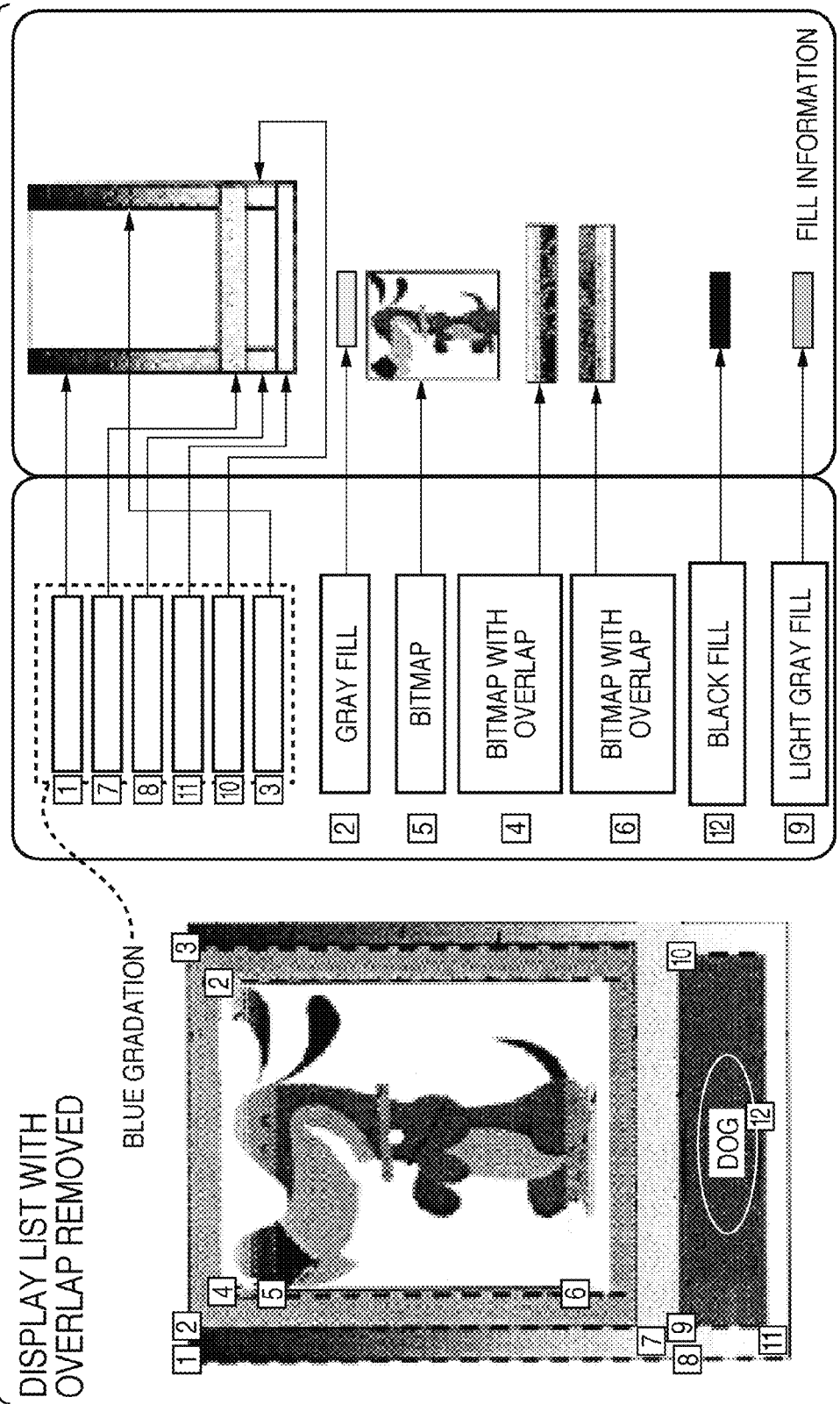

F I G. 14
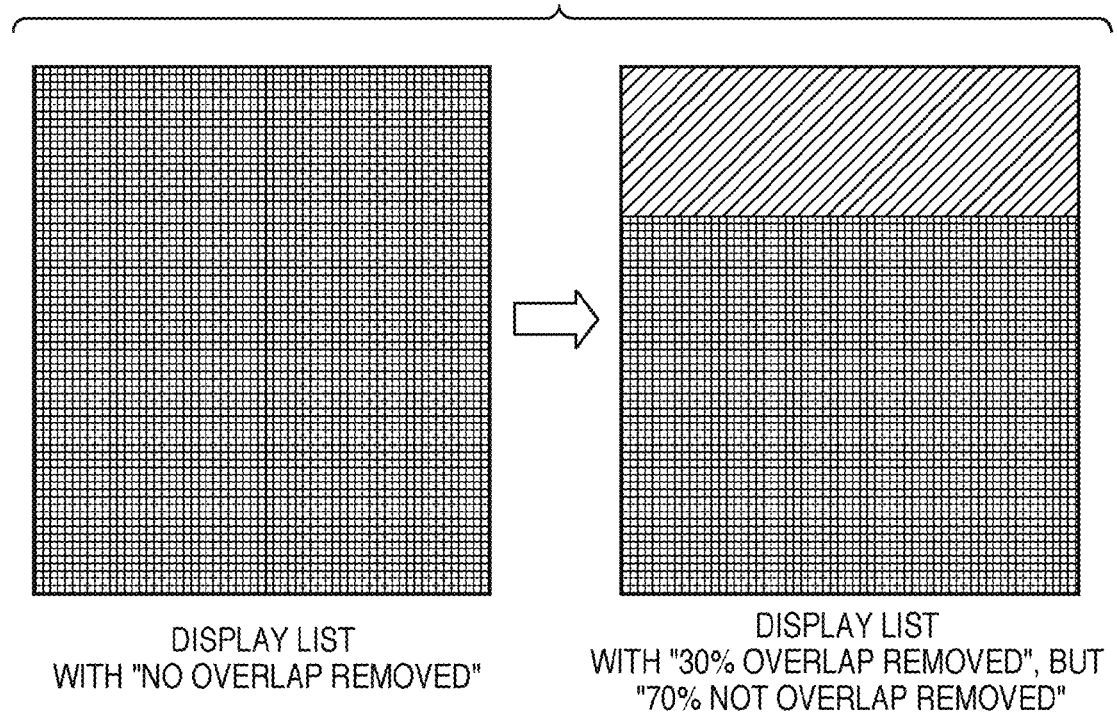

METHOD, APPARATUS, AND PROGRAM FOR GENERATING BITMAP DATA

BACKGROUND OF THE INVENTION

1. Field of the Invention

The present invention relates to an image processing method, an image processing apparatus, and a program for executing that image processing method. In particular, the present invention relates to an image processing method and image processing apparatus having a method for controlling load balancing of PDL processing and RIP processing, and a program for executing that image processing method.

Here, PDL processing is processing that analyzes a Page Description Language and generates a display list. RIP processing is processing that renders the display list as bitmap data using a Raster Image Processor.

2. Description of the Related Art

In parallel processing or pipeline processing of PDL processing and RIP processing in convention print processing using a plurality of CPUs, there are instances of load unbalancing in which (1) a load unbalance occurs according to a drawing area during RIP processing, and (2) a load unbalance occurs between PDL processing and RIP processing.

As a result of that load unbalancing, there is the problem that even if parallel processing is performed, the speed of processing is limited by the slower processing, so that optimal parallel processing or pipeline processing cannot be performed.

The following sorts of proposals have been made to address such problems.

In order to address problem (1), in Japanese Patent Laid-Open No. 10-52950, when generating a DL from PDL data that has been input, the processing load of each drawing area is predicted from the PDL data, and a load correction value is generated. By assigning a region of a drawing area to a plurality of drawing processing units such that the loads are balanced, an attempt is made to address the problems.

In order to address problem (2), in Japanese Patent Laid-Open No. 2005-63027, a selection is made of whether the drawing processing of each processor is set to be processing of rendering to a bitmap (bitmap rendering), or processing (empty drawing) of only updating drawing parameters (vector information). Herein, it is proposed to balance the load of drawing processing on a plurality of processors by this selection.

However, with the above-described conventional techniques, there are problems as follows.

First, in Japanese Patent Laid-Open No. 10-52950, a correction value is generated at the same time as generating a DL, but this correction value generation itself introduces overhead, and there is a possibility that this will reduce the overall print processing capability. In the case of simple data, that overhead is not particularly large, but as the complexity of the data increases, the time required to generate a correction value is expected to increase. Also, there is no description indicating that an accurate processing time cannot be predicted for CPU assignment when there are a plurality of CPUs that perform PDL processing or RIP processing.

On the other hand, in Japanese Patent Laid-Open No. 2005-63027, because interpreter processing of the same PDL data is performed in parallel by a plurality of processors (CPUs), unnecessary processing (empty drawing of a page in which drawing is not performed as a result: PDL processing is also performed) occurs. Also, in Japanese Patent Laid-Open No. 2005-63027, because a memory area in which data is held when performing PDL processing is necessary for each processor (CPU), the amount of memory used is large.

SUMMARY OF THE INVENTION

The present invention, in view of the problems described above, provides an image processing method and image processing apparatus that are capable of quickly and easily balancing the load of PDL processing and RIP processing, thus realizing efficient pipeline processing, and provides a program that executes that image processing method.

Also, the present invention provides an image processing method and image processing apparatus that generate a DL that has not been rendered to a bitmap in PDL processing, so that the amount of memory used in RIP processing can be suppressed to a low level, and provides a program that executes that image processing method.

In order to address the above problems, the present invention provides an image processing method of generating a display list from PDL data described in a page description language (PDL), and generating bitmap data by rendering the display list, the method comprising: a determining step of, before starting PDL processing in which the display list is generated from PDL data, determining whether to generate a display list with overlap removed or a display list without overlap removed in the PDL processing to balance a load of the PDL processing and a load of RIP processing in which the bitmap data is generated by rendering the display list; a first bitmap data rendering step of, when it is determined to generate a display list without overlap removed in the determination step, generating a display list without overlap removed in the PDL processing and generating bitmap data based on the display list without overlap removed in the RIP processing; and a second bitmap data rendering step of, when it is determined to generate a display list with overlap removed in the determination step, generating a display list with overlap removed in the PDL processing and generating bitmap data based on the display list with overlap removed in the RIP processing.

The present invention provides a computer-readable storage medium which stores a program of causing a computer to execute steps of the image processing method as recited above.

Also, the present invention provides an image processing apparatus for generating a display list from PDL data described in a page description language (PDL), and generating bitmap data by rendering the display list, the apparatus comprising: a first bitmap data rendering unit configured to generate a display list without overlap removed in PDL processing in which a display list is generated from the PDL data, and generate bitmap data based on the display list without overlap removed in RIP processing in which bitmap data is generated by rendering the display list; a second bitmap data rendering unit configured to generate a display list with overlap removed in the PDL processing, and generate bitmap data based on the display list with overlap removed in the RIP processing; and a determining unit configured to, before starting the PDL processing on the PDL data, determine whether to generate the display list with overlap removed or the display list without overlap removed in the PDL processing to balance a load of the PDL processing and a load of the RIP processing.

The present invention provides an image forming apparatus that includes the image processing apparatus as recited above, and forms an image represented by the bitmap data generated by the RIP processing.

Further, the present invention provides an image processing apparatus comprising: a PDL processing unit configured to generate a display list from PDL data described in a page description language (PDL); and a RIP processing unit configured to generate bitmap data by rendering the display list generated by the PDL processing unit, wherein it is determined whether the PDL processing unit generates a display list with overlap removed or a display list without overlap removed in accordance with a capability of the PDL processing unit, a capability of the RIP processing unit and an awaiting state of the RIP processing unit, the RIP processing unit generates bitmap data based on the display list without overlap removed when the PDL processing unit generates a display list without overlap removed, and the RIP processing unit generates bitmap data based on the display list with overlap removed when the PDL processing unit generates a display list with overlap removed.

In the present invention, in PDL processing, a switch is made between generating a DL in which level processing is not performed according to a next condition (a DL with level information remaining), and generating a DL in which level processing has been performed (a DL in which level information has been removed). The conditions for switching are the number of data units awaiting processing, which are accumulated in a queue for PDL processing and RIP processing, and the number of CPUs that can perform PDL processing or RIP processing.

As a result, it is possible to quickly and easily balance the load of PDL processing and RIP processing, and thus it is possible to realize efficient pipeline processing.

Also, because data is held in only one area when performing PDL processing, it is possible to suppress the amount of memory to a low level.

Further features of the present invention will become apparent from the following description of exemplary embodiments with reference to the attached drawings.

BRIEF DESCRIPTION OF THE DRAWINGS

FIG. 7B shows an example of the detailed configuration of the display list with overlap removed in the present embodiment.

FIG. 14 shows an example of generating a display list in which a portion with overlap removed and a portion without overlap removed are included at a predetermined ratio, in a modified example of Embodiment 1.

DESCRIPTION OF THE EMBODIMENTS

The embodiments of the present invention are described with reference to the attached drawings.

Embodiment 1

>Configuration of Image Processing Apparatus of Present Embodiment≦

Figure 1:
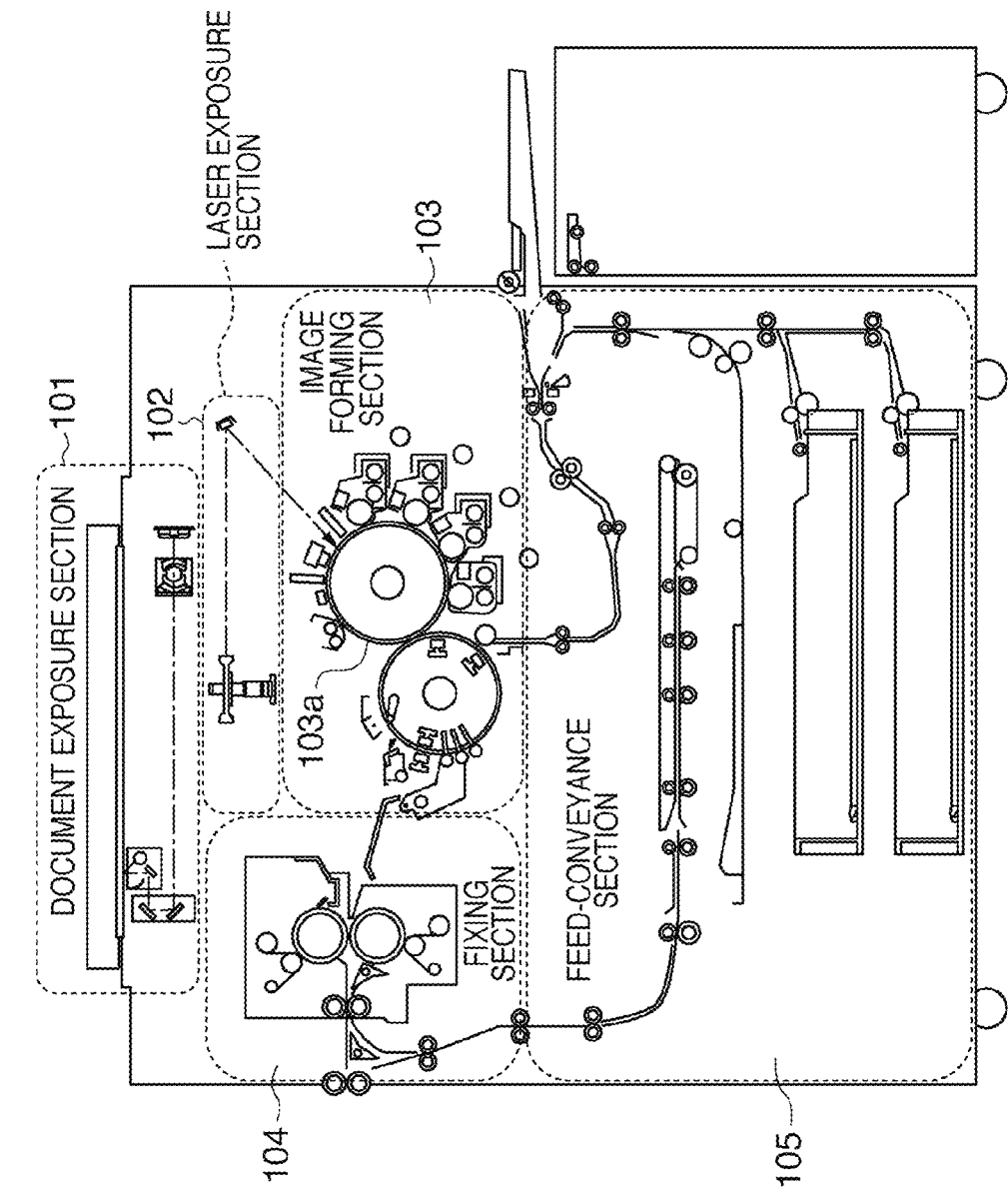
FIG. 1 is a side cross-sectional view that shows an example structure of an image forming apparatus (MFP) of the present embodiment.

An example configuration of a 1D color MFP (Multi Function Peripheral) that is for application of the present embodiment will be described with reference to FIG. 1.

The 1D color type MFP is configured from a document exposure section 101, a laser exposure section 102, a photosensitive drum 103a, an image forming section 103, a fixing section 104, a feed-conveyance section 105, and a printer control section (not shown) that controls these constituent parts.

The document exposure section 101 applies light to an original that has been placed on a platen to optically read an original image, and converts that image to an electrical signal to create image data.

The laser exposure section 102 causes a light ray such as a laser beam modulated according to the image data to be incident on a rotating polygon mirror that rotates at an equiangular velocity, and this light is irradiated on the photosensitive drum 103a as reflected scanning light.

In the image forming section 103, the photosensitive drum 103a is rotationally driven, charging is performed with a charger, a latent image that has been formed on the photosensitive drum 103a by the laser exposure section 102 is developed with toner, and that toner image is transferred to a sheet. At this time a small amount of toner that remains on the photosensitive drum 103a without being transferred is recovered. By executing this manner of a single iteration of an electrophotographic process, image forming is performed.

At this time, the sheet is wrapped to a transfer belt at a predetermined position, and while making four rotations, development units (development stations) that respectively have toner of magenta (M), cyan (C), yellow (Y), and black (K) trade places. The above-described electrophotographic process is successively executed repeatedly. After four rotations, the sheet on which a 4-color full-color toner image has been transferred is separated from a transfer drum and conveyed to the fixing section 104.

The fixing section 104 is comprised of a combination of rollers and belts, and includes a heat source such as a halogen heater, and employs heat and pressure to melt and fix the toner on the sheet to which a toner image has been transferred by the image forming section 103.

The feed-conveyance section 105 has at least one sheet repository, typified by a sheet cassette or a paper deck. The feed/conveyance section 105, in response to an instruction from the printer control section, separates one sheet from a plurality of sheets that are stored in the sheet repository, and conveys that sheet from the image forming section 103 to the fixing section 104. The sheet is wrapped to the transfer drum of the image forming section 103, and conveyed to the fixing section 104 after four rotations. During the four rotations, the above-described toner images of each color YMCK are transferred to the sheet. Also, when forming an image on both faces of the sheet, control is performed such that after the sheet has passed through the fixing section 104, the sheet passes through a conveyance path where the sheet is again conveyed to the image forming section 103.

The printer control section communicates with an MFP control section that controls the MFP as a whole, to execute control according to an instruction from the MFP control section. At the same time, while managing the state of the respective parts responsible for the above-described document exposure, laser exposure, image forming, fixing, and feed-conveyance, the printer control section gives instructions such that the MFP as a whole can operate smoothly and in concert.

<Example Hardware Configuration of Printer Control Section>

Figure 2:
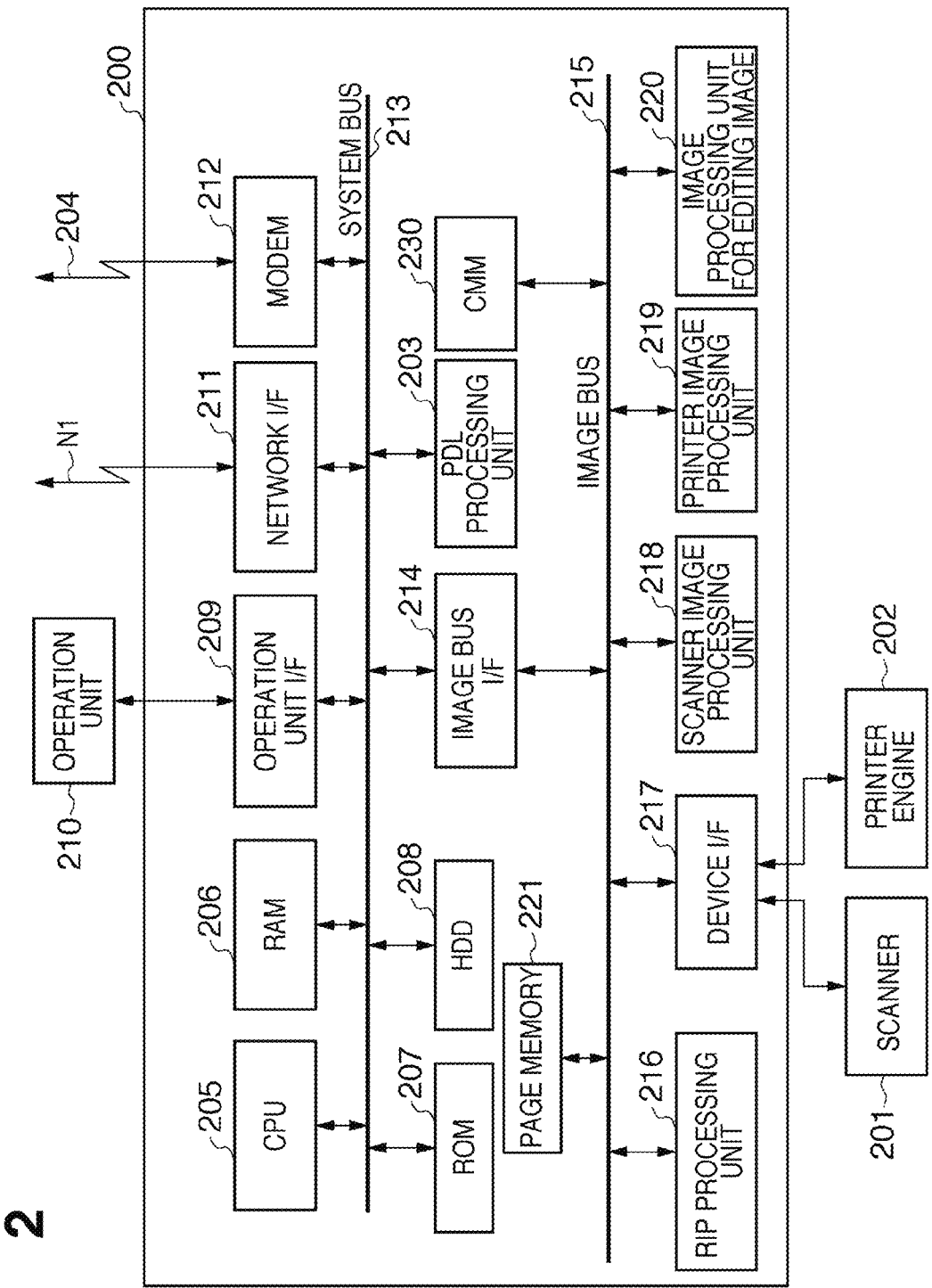
FIG. 2 is a block diagram that shows an example configuration of a printer control section in the present embodiment.

FIG. 2 is a block diagram that shows an example of the hardware configuration of a printer control section (controller) of the MFP in the present embodiment.

In FIG. 2, a printer control section 200 is connected to a scanner 201 that is an image input device and a printer engine 202 that is an image output device, and performs control for reading image data and print output. Also, the printer control section 200, by connecting with a LAN_N1 or a public line 204, performs control for input-output of image information or device information via the LAN_N1.

A CPU 205 is a central processing apparatus for controlling the MFP as a whole. A RAM 206 is a system work memory for allowing the CPU 205 to operate, and is an image memory for temporarily storing image data that has been input. Further, a ROM 207 is a boot ROM, where a system boot program is stored. An HDD 208 is a hard disk drive, and stores both system software for various processing and image data that has been input. A PDL processing unit 203 analyzes page description language (PDL hereinafter) data that has been input, and generates a display list (a DL hereinafter) by switching between a display list without level processing and a DL with level processing, according to an instruction from the CPU 205. The instruction from the CPU 205, as described below, is switched by the number of items in the queues of PDL processing and RIP processing that have been stored in the RAM 206 and the HDD 208, and the number of CPUs that have been assigned to PDL processing and RIP processing.

An operation unit I/F 209 is an interface with an operation unit 210 that has a display screen capable of displaying image data or the like, and outputs operation screen data to the operation unit 210. Also, the operation unit I/F 209 fulfills a role of transmitting information that an operator has input from the operation unit 210 to the CPU 205. A network interface 211, for example, is realized with a LAN card or the like, and is connected to the LAN_N1 and performs input-output of information to/from an external apparatus. Furthermore, a modem 212 is connected to the public line 204, and performs input-output of information to/from an external apparatus.

The above units are disposed in a system bus 213. An image bus I/F 214 is an interface for connecting the system bus 213 to an image bus 215 that transfers image data at high speed, and is a bus bridge that converts a data structure.

A raster image processor (RIP processing unit) 216, a device I/F 217, a scanner image processing unit 218, and a printer image processing unit 219 are connected on the image bus 215. Also, an image processing unit for editing image 220, a page memory 221, and a color management module 230 are connected. The RIP processing unit 216 renders DL vector data to an image, and temporarily stores the result in the page memory 221.

The device I/F 217 connects the scanner 201 and the printer engine 202 with the printer control section 200, and performs conversion between synchronization/non-synchronization of image data.

Also, the scanner image processing unit 218 performs various processing of image data that has been input from the scanner 201, such as correction, manipulation, and editing. The printer image processing unit 219 performs processing of image data to be output by printing, such as correction and resolution conversion according to the printer engine. The image processing unit for editing image 220 performs various image processing such as image data rotation and image data compression/decompression processing. The CMM 230 is a dedicated hardware module that performs color conversion processing (also called color space conversion processing) of image data, based on a profile or calibration data. A profile is information such as a function for converting color image data expressed in a device-dependent color space to a color space that is not device-dependent (for example, such as a Lab color space). Calibration data is data for adjusting color reproduction characteristics of the scanner 201 or the printer engine 202 in a color multifunction peripheral.

<Example Software Configuration of Printer Control Section>

Figure 3:
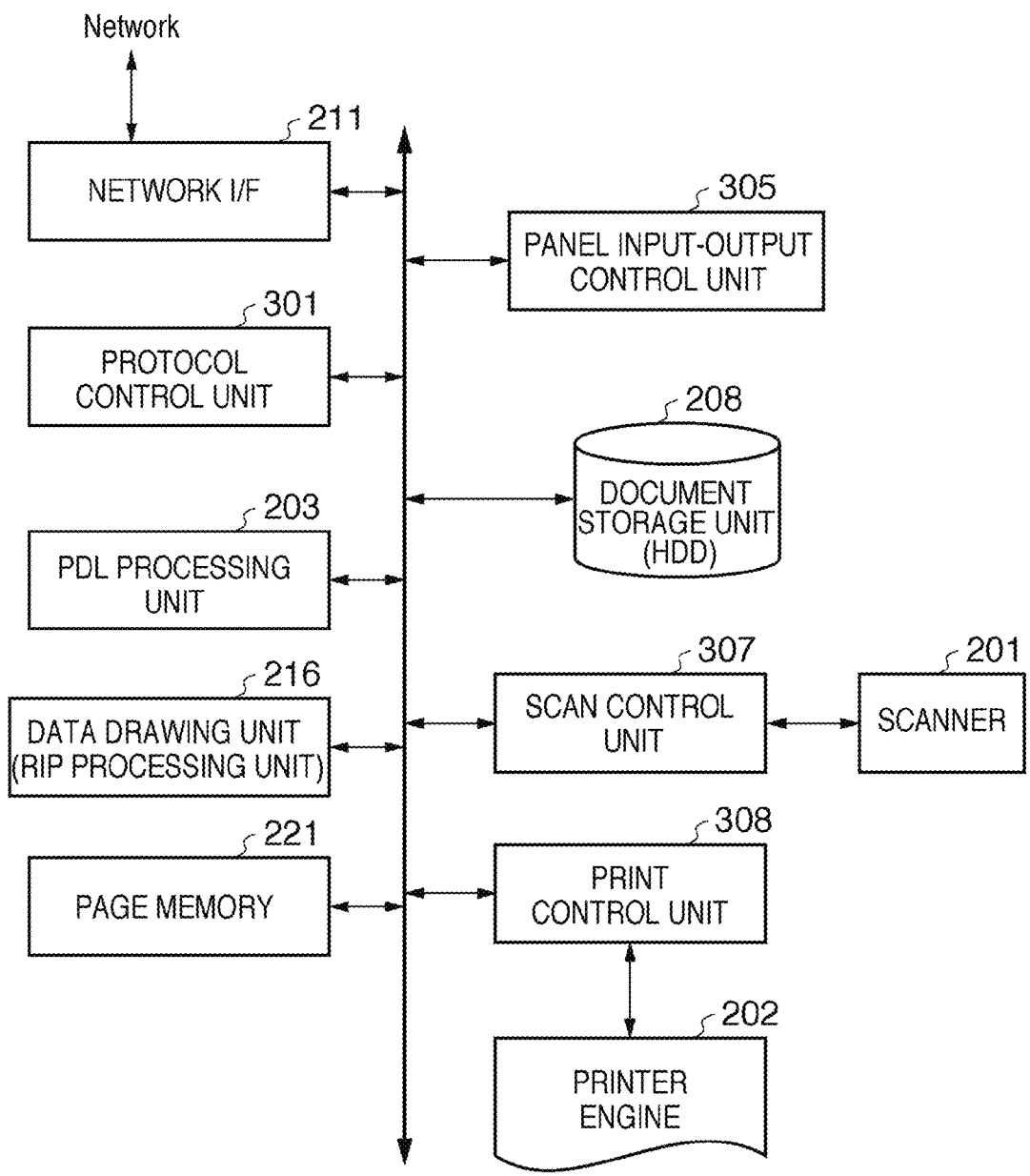
FIG. 3 is a block diagram that shows one example of the configuration of a controller in the present embodiment.

FIG. 3 is a block diagram that shows an example of the software configuration of the printer control section that controls operation of the MFP. In FIG. 3, the respective parts other than the page memory (for example, RAM) 206 and the document storage unit (for example, HDD) 208 are realized by software processing by the CPU 205 or by a plurality of CPUs that perform PDL processing or RIP processing. In FIG. 3, the constituent elements that fulfill the same functions as in FIG. 2 are indicated by the same reference numerals.

The network I/F 211 is an interface for input-output with the outside. A protocol control unit 301 is a control unit that performs external communications by analyzing a network protocol and performing sending.

The PDL processing unit 203 is a processing unit that analyzes PDL data, and converts the analyzed data to a DL in a more easily processed format. The DL generated in the PDL processing unit 203 is transferred to the data drawing unit (RIP processing unit) 216, and processed. The RIP processing unit 216 renders the DL generated by the PDL processing unit 203 to bitmap data, and the rendered bitmap data is sequentially drawn in the page memory 221. The page memory 221 is a volatile memory that temporarily holds bitmap data rendered by a renderer.

A panel input-output control unit 305 controls input-output from an operation panel. The document storage unit 208 is a secondary storage apparatus such as a hard disk that stores data files. A scan control unit 307 performs various processing of image data that has been input from the scanner 201, such as correction, manipulation, and editing. A print control unit 308 performs processing to convert the contents of the page memory 221 to a video signal, and performs image transfer to the printer engine 202. The printer engine 202 is a printing mechanism for performing permanently visible image formation of a received video signal to recording paper.

<Example Functional Configuration of Image Processing of Present Embodiment>

Figure 4:
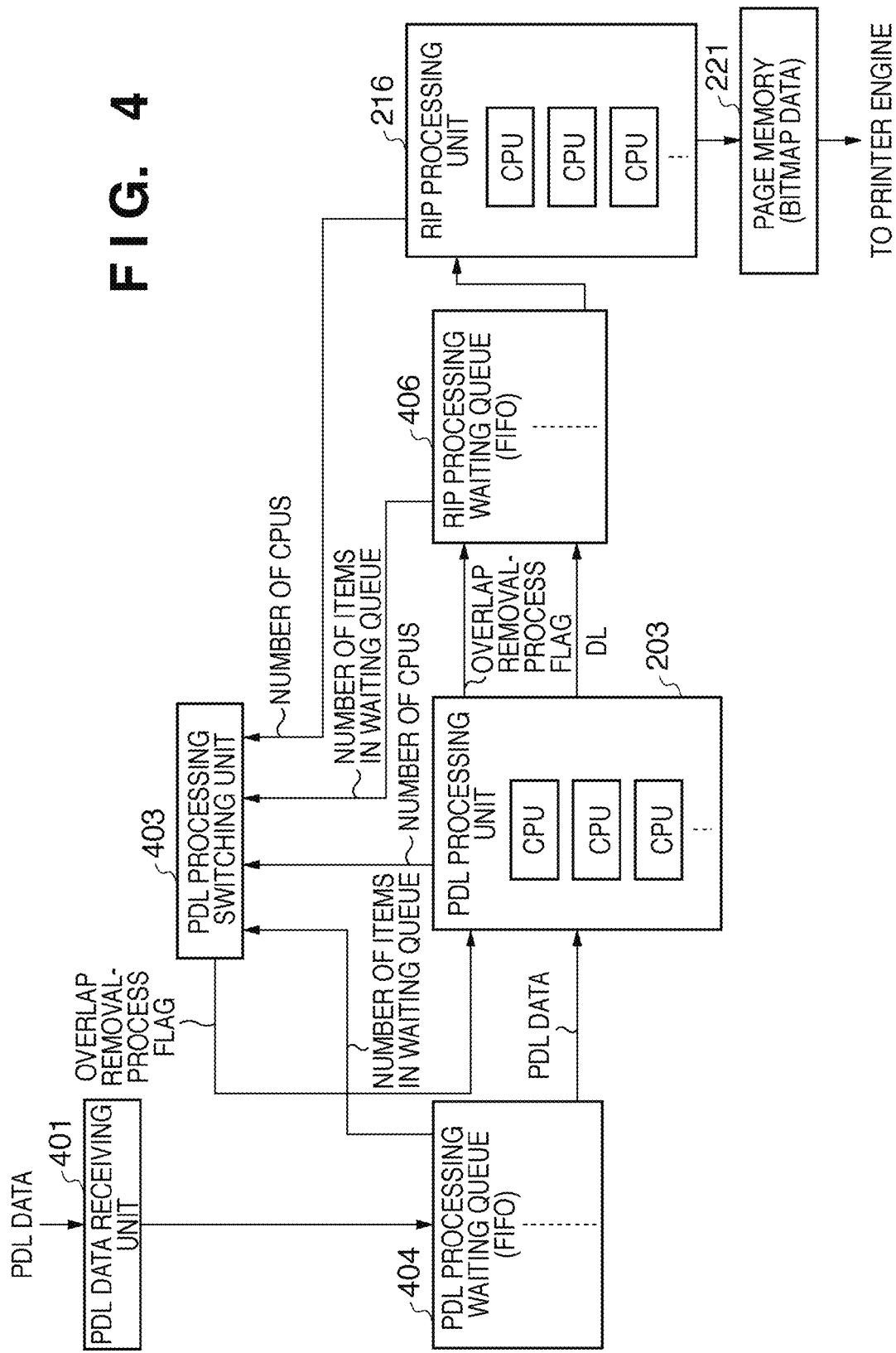
FIG. 4 is a block diagram that shows an example of the functional configuration of a printer control section in Embodiment 1.

FIG. 4 shows an example of the functional configuration of image processing in the printer control section of the present embodiment. The same constituent elements as in FIGS. 2 and 3 are indicated by the same reference numerals. Following is a description according to the flow of image data.

In FIG. 4, reference numeral 401 denotes a PDL data receiving unit that receives external PDL data. PDL data that has been received by the PDL data receiving unit 401 is sequentially queued in a PDL processing waiting queue 404. PDL data that has been queued in the PDL processing waiting queue 404 is read out to the PDL processing unit 203 in a first in, first out (FIFO) manner, and parallel processing of that data is performed by a plurality of CPUs of the PDL processing unit 203. At this time, in a PDL processing switching unit 403, a determination is made of whether or not to perform overlap removal in the PDL processing unit 203, and the PDL processing unit 203 is notified of this determination is made to via an overlap removal-process flag.

Here, the overlap removal-process flag is determined according to the number of waiting items in the PDL processing waiting queue 404, the number of operable CPUs in a PDL processing unit 405 described later, the number of waiting items in a RIP processing waiting queue 406, and the number of operable CPUs in the RIP processing unit. In the present embodiment, the number of queued items and the number of CPUs are simplified, but the number of queued items is only an example that indicates a load amount, and the number of CPUs is only an example that indicates a processing amount. As for adopting various conditions, a more precise load amount and processing amount can be calculated; using the number of queued items and the number of CPUs is not a limitation. It is a feature of the present invention that switching of whether or not to perform overlap removal by PDL processing is performed based on the load amount and the processing amount.

A DL with overlap removed or a DL without overlap removed that has been processed according to the overlap removal-process flag by the PDL processing unit 203 is queued along with the overlap removal-process flag in the RIP processing waiting queue 406. Note that a configuration may also be adopted in which instead of using an overlap removal-process flag, whether or not to perform overlap removal is stored in the DL, and the RIP processing unit 216 analyzes the DL and makes a judgment prior to processing.

The DL of the RIP processing waiting queue 406 is read out to the RIP processing unit 216 in a first in, first out (FIFO) manner, and is rendered to bitmap data by parallel processing by a plurality of CPUs of the RIP processing unit 216 according to whether or not to perform overlap removal. The bitmap data that has been rendered by the RIP processing unit 216 is temporarily stored in the page memory 221, and is output to the printer engine 202 for image formation of one page.

(Example Data and Programs Necessary For Image Processing of Present Embodiment)

Figure 5:
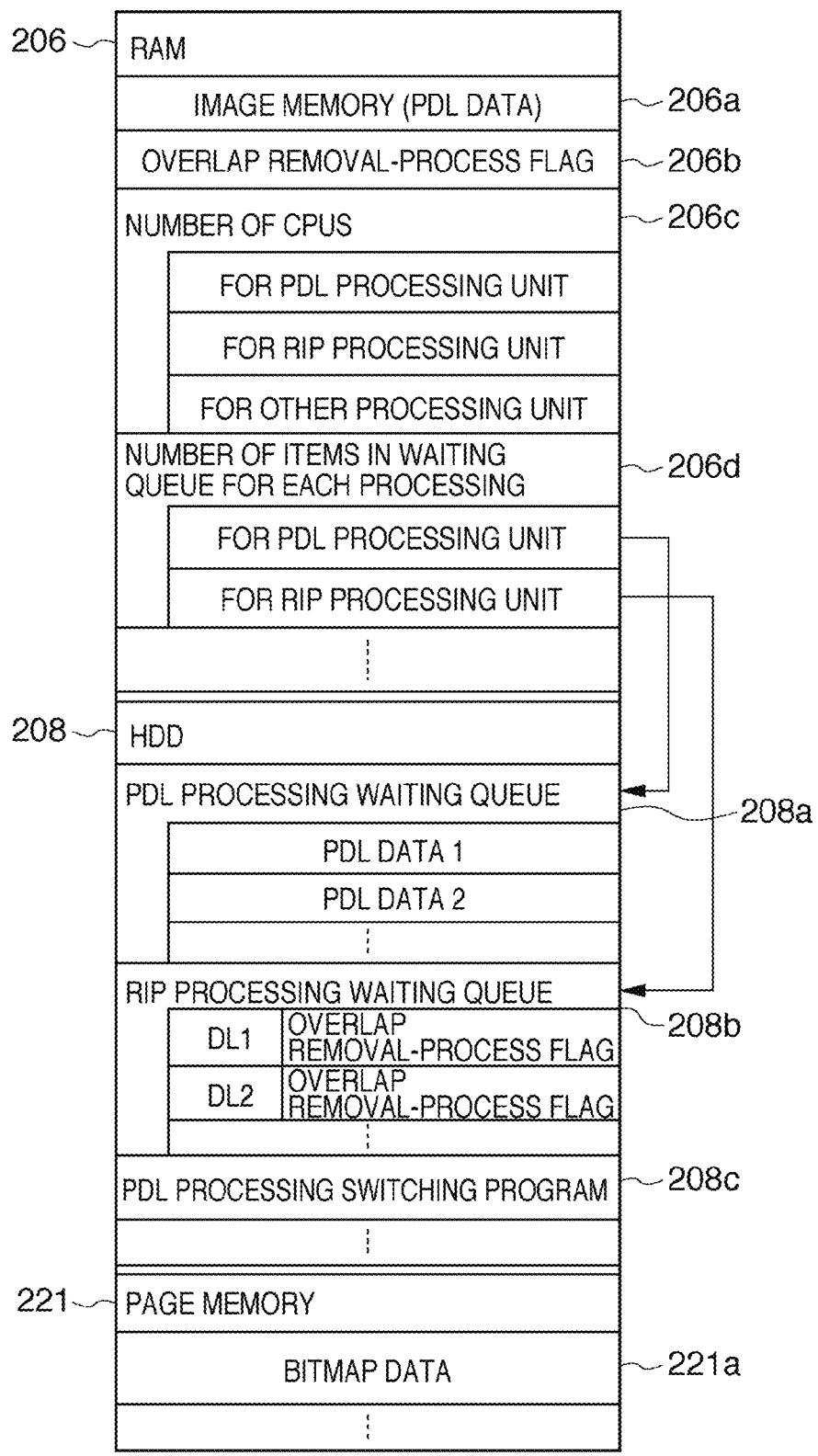
FIG. 5 shows an example of storage of programs and data that are used in Embodiment 1.

FIG. 5 shows an example of data and programs needed for image processing by the printer control section of the present embodiment. In FIG. 5, only data and programs that are features of the present embodiment are shown; other general-purpose data and programs are omitted. The same constituent elements as in FIG. 2 are indicated by the same reference numerals in FIG. 5.

In FIG. 5, the below data is temporarily stored in the RAM 206. Reference numeral 206a denotes an image memory storage area where received PDL data is temporarily stored. Reference numeral 206b denotes a storage area for the overlap removal-process flag that determines whether or not to perform overlap removal in PDL processing. The PDL data stored in the storage area 206a is queued in a PDL processing waiting queue 208a described later. Reference numeral 206c denotes a number of CPUs storage area where a number of CPUs usable in the PDL processing unit and a number of CPUs usable in RIP processing are stored. Reference numeral 206d denotes a storage area for a number of waiting items queued for each type of processing where a number of queued items waiting for processing of the PDL processing unit and a number of queued items waiting for RIP processing are stored.

Figure 13A:
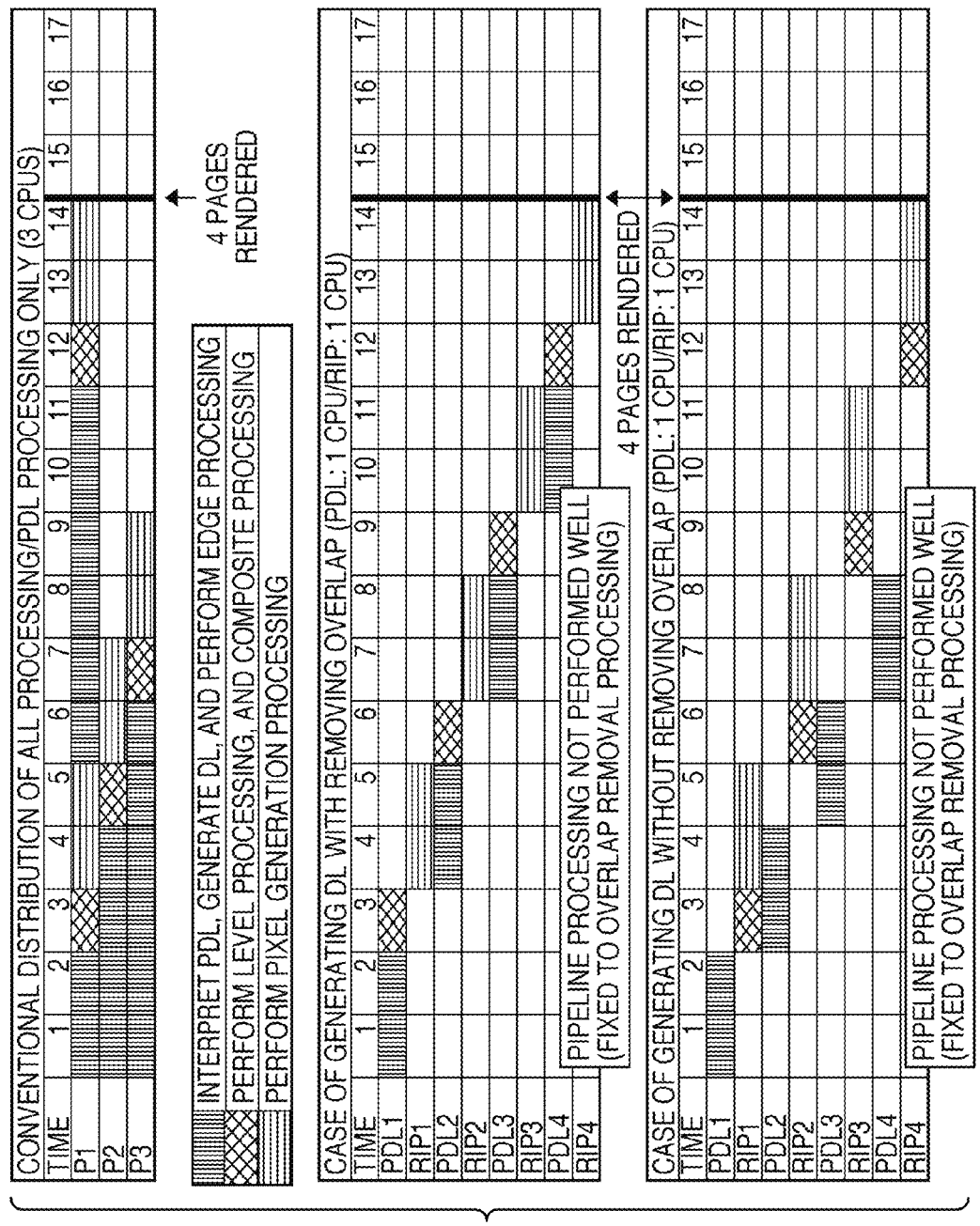
FIG. 13A shows examples of pipeline processing when there is an unbalance in the load of PDL processing and RIP processing in a conventional example and when overlap removal is fixed.

In FIG. 5, the data and programs below are stored in the HDD 208. Reference numeral 208a denotes a PDL processing waiting queue (see reference numeral 404 in FIG. 4) that stores, in a FIFO manner, PDL data for generating a DL in the PDL processing unit 203. Reference numeral 208b denotes a RIP processing waiting queue (see reference numeral 406 in FIG. 4) that stores, in a FIFO manner, a DL with an overlap removal-process flag for rendering bitmap data from a DL in the RIP processing unit 216. Reference numeral 208c denotes an area where a PDL processing switching program according to a flowchart shown in below FIG. 13A is stored. This PDL processing switching program is loaded to the RAM 206 and executed by the CPU 205.

In FIG. 5, bitmap data 221a that has been rendered by the RIP processing unit 216 is temporarily stored in the page memory 221.

<Example Data Processing of Printer Control Section of Present Embodiment>

Figure 6A:
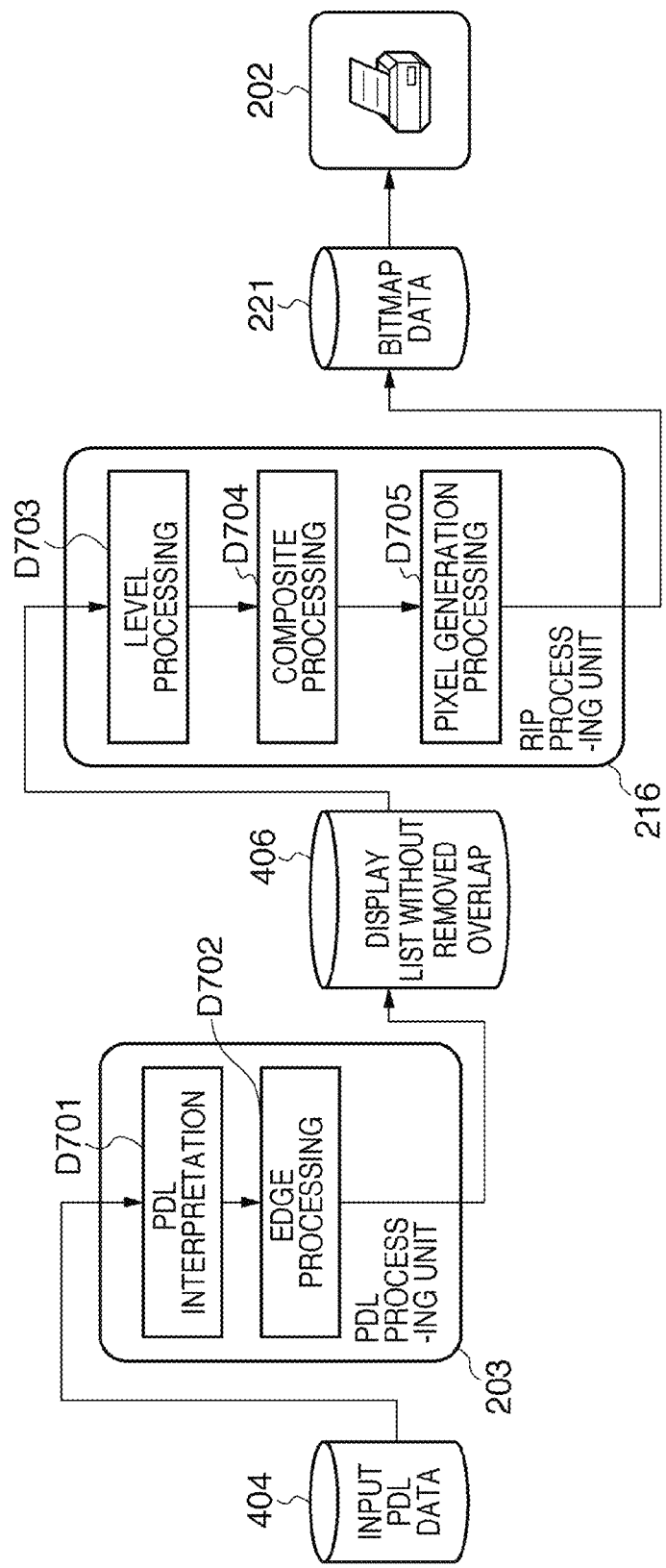
FIG. 6A shows an example of processing for a display list without overlap removed in the present embodiment.
Figure 6B:
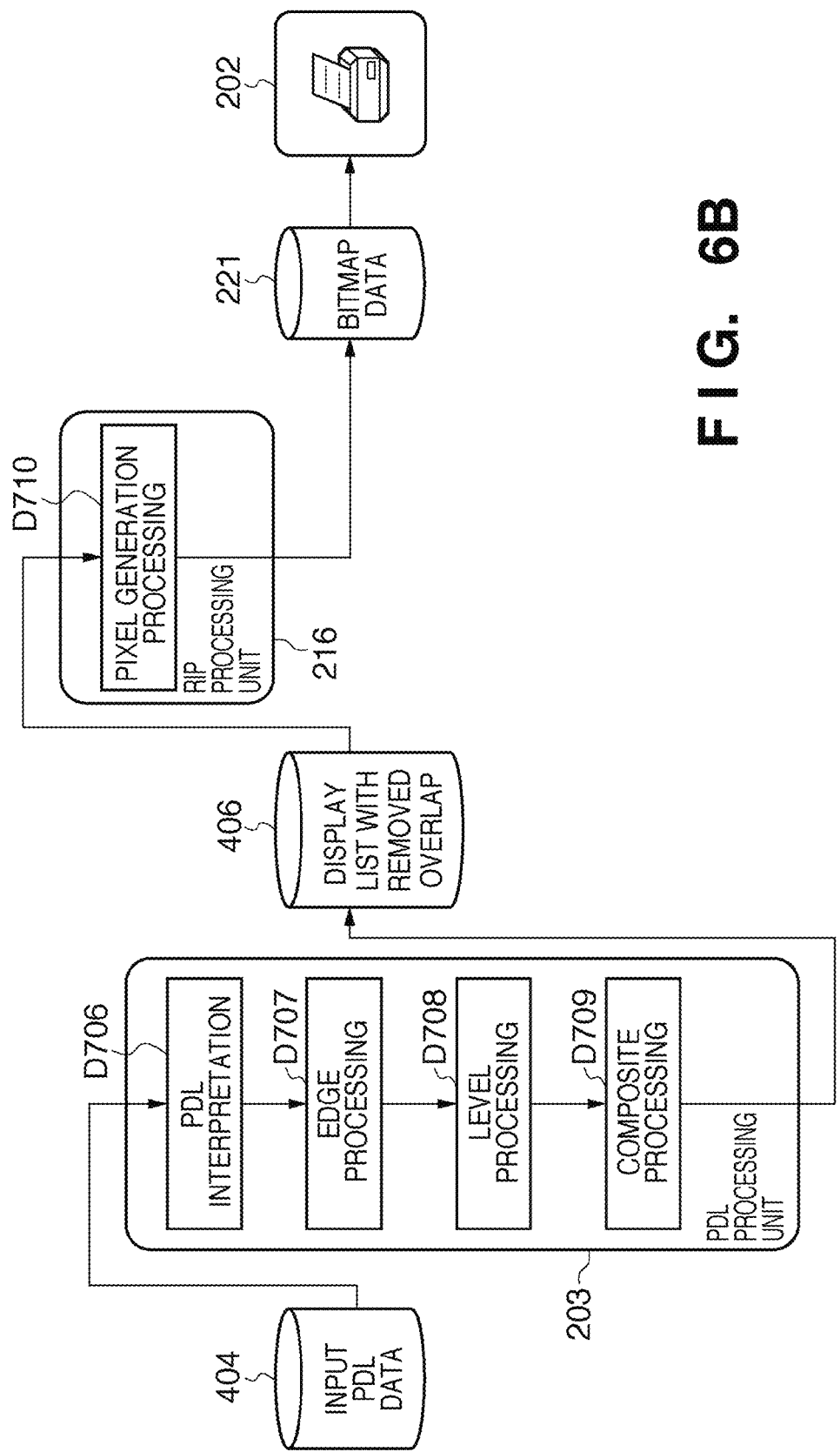
FIG. 6B shows an example of processing for a display list with overlap removed in the present embodiment.

Next is a description of the load of the PDL processing unit and the RIP processing unit in generation of a DL without overlap removed and a DL with overlap removed, and generation of bitmap data from a DL, with reference to FIGS. 6A and 6B. In the present embodiment, as shown in FIGS. 6A and 6B, two bitmap data renders with a differing load for the PDL processing unit and the RIP processing unit are prepared, and these two bitmap data renders are assigned such that the load is balanced. The same reference numbers are attached to the same constituent elements as in FIGS. 2 to 5.

Printing by PDL data means a printer operation in which, when printing has been instructed from application software on a PC (Personal Computer), PDL data generated by a printer driver on the PC is received and output.

(Generation of DL Without Overlap removed: First Bitmap Data Render)

FIG. 6A shows the data flow in the printer control section when generating a DL without overlap removed.

Received PDL data, after being queued in the PDL processing waiting queue 404, first is analyzed by a PDL data analysis processing D701 in the PDL processing unit 203. Next, an edge processing D702 that extracts an intersection point of an edge with each scan line from the start of the page is performed. When the edge processing D702 is finished, the data output from the PDL processing unit 203 is a DL without overlap removed. The DL without overlap removed is queued in the RIP processing waiting queue 406.

Next, in the RIP processing unit 216, a level processing D703 is performed using the DL without overlap removed as input data. In the level processing D703, based on level information possessed by a portion to be filled that is included between intersection points (referred to as a span) extracted by the edge processing D702, data is sorted from highest rank to lowest rank. Unnecessary data that is concealed by a higher ranking level is removed. Next, composite processing D704 is performed. Composite processing is processing that ultimately converts a plurality of fills to one fill based on overlapping information (raster operation or transparency processing) possessed by fills for which sort processing has finished. Finally, in a pixel generation processing D705, processing is performed that generates pixels for the span calculated by the edge processing D702, and thus bitmap data is rendered. The bitmap data is temporarily stored in the page memory 221, transferred to the printer engine 202, and finally an image is output onto paper.

(Generation of DL With Overlap removed: Second Bitmap Data Render)

Next, FIG. 6B shows the data flow in the printer control section when generating a DL with overlap removed.

Here, the difference from the data flow of generation of a DL without overlap removed is that subsequent to edge processing D707, edge processing D708 and composite processing D709 are also performed in the PDL processing unit 203, thus generating a DL with overlap removed. As a result, the DL output from the PDL processing unit 203 to the RIP processing waiting queue 406 is a DL with overlap removed, so bitmap data can be generated by only performing pixel generation processing D710 in the RIP processing unit 216, without further processing of the DL.

The size of the processing load is clear from a comparison of FIGS. 6A and 6B. More specifically, when generating a DL without overlap removed by PDL processing as shown in FIG. 6A, the load of the PDL processing, which does not include level processing or composite processing, is small, and the load of the RIP processing, to which level processing and composite processing has been added, is large. On the other hand, when generating a DL with overlap removed by PDL processing as shown in FIG. 6B, the load of the PDL processing, which requires level processing and composite processing, is large, and the load of the RIP processing, which includes only pixel generation processing and not level processing or composite processing, is small.

<Example Data Structure of DL>

Figure 7A:
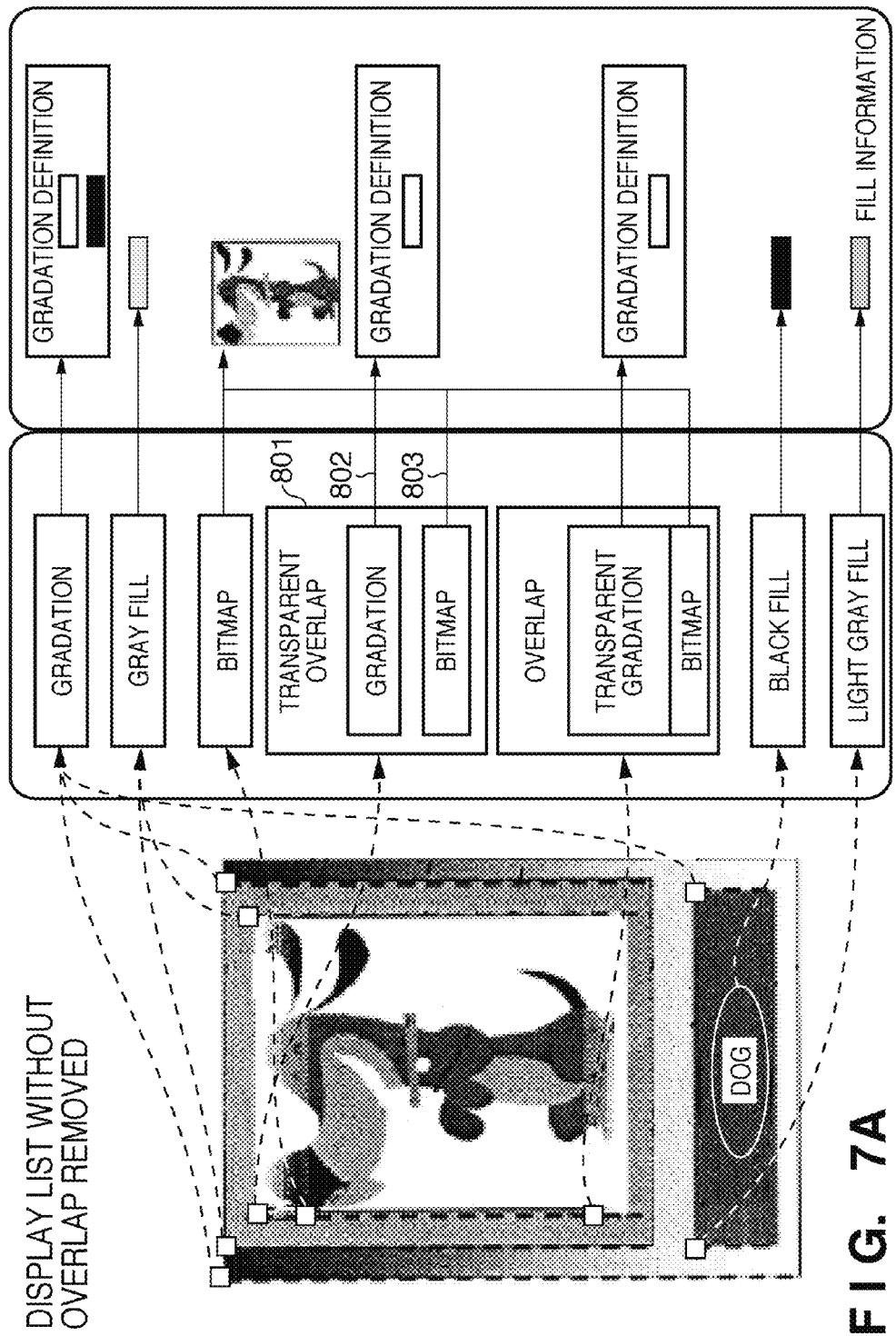
FIG. 7A shows an example of the detailed configuration of the display list without overlap removed in the present embodiment.

Next is a description of the structure of a DL without overlap removed and a DL with overlap removed, with reference to FIGS. 7A and 7B. In FIGS. 7A and 7B, the image on the left side is the illustration that is ultimately output, and the middle and the right side show the state of the data that is included in the DL.

(Example Configuration of DL Without Overlap removed)

FIG. 7A shows an example data configuration of a DL without overlap removed.

In the DL without overlap removed, a vertical transparency gradation portion of a picture of a dog is not a bitmap in which bitmap and transparency gradation have been composed. Instead, the DL without overlap removed has a structure in which a gradation 802 and a bitmap 803 are linked from transparency overlapping information 801. The gradation as well is not an actual bitmap, but is included in the generated DL in the form of a gradation definition with a starting color, ending color, width, and the like.

(Example Configuration of DL With Overlap Removed)

On the other hand, FIG. 7B shows an example data configuration of a DL with overlap removed.

In the DL with overlap removed, a bitmap and a gradation are included in the generated DL as a bitmap after being overlapped with a transparency, so two or more levels are not present. Also, a gradation in the form of a bitmap is included in the generated DL.

Here, level means the vertical relationship of objects included in the DL, and each object has a unique level number. When a plurality of objects overlap in a scan line in processing, the object with a higher level number is positioned on top. In level processing, when there is one object in a scan line in processing, it is not necessary to perform overlap processing (of overlapping information), so the fill of that object is rendered without further processing. However, when there are two or more objects, the vertical relationship of those objects is calculated based on their level numbers, and it is further necessary to perform overlap processing based on the overlapping information. For the object that is output last, a fill after overlap processing is output.

<Example of Overlap Removal and Rendering of Overlapping Information>

Following is a description of how the overlapping information 801, 802, and 803 are rendered.

Figure 8:
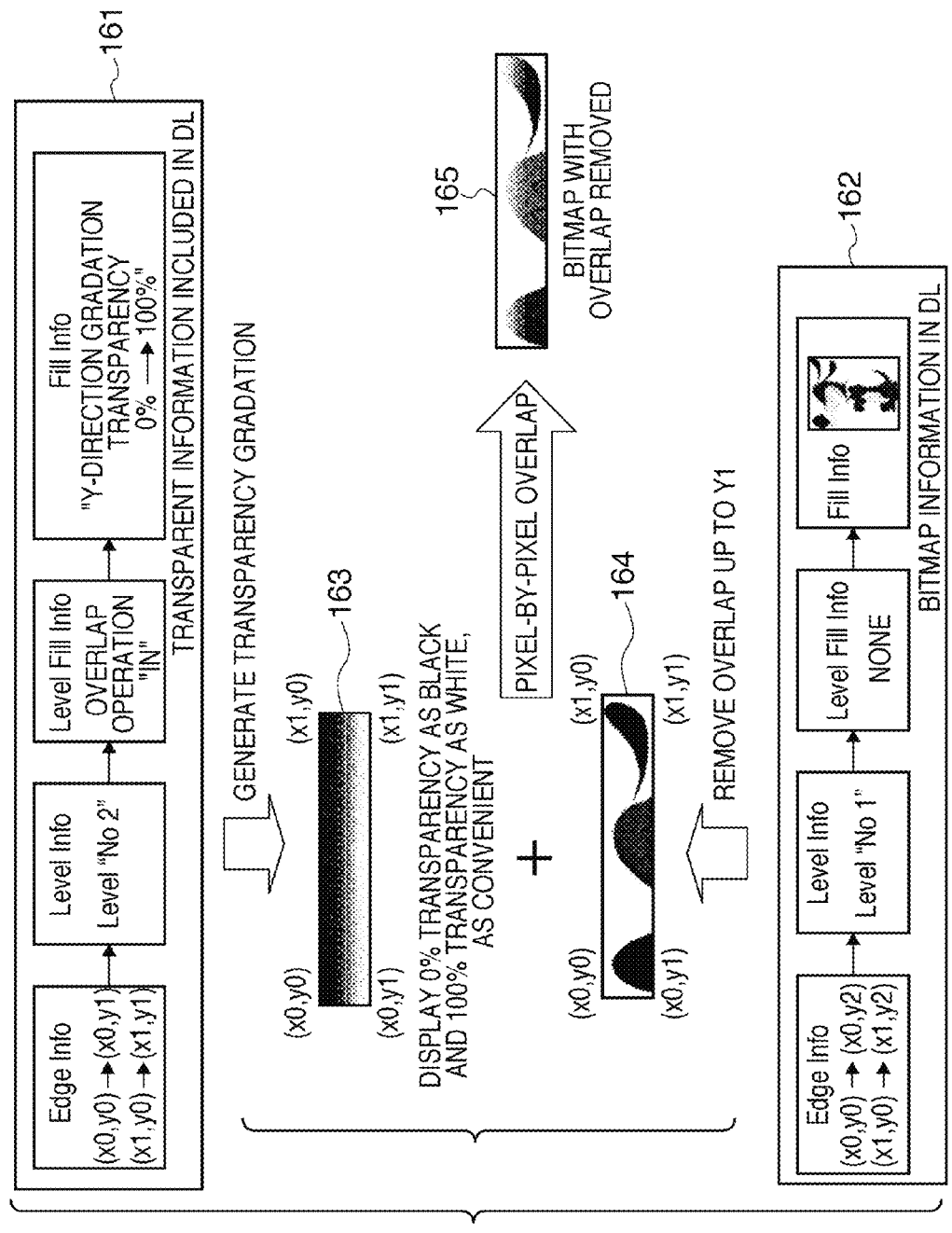
FIG. 8 shows an example of processing in which the display list without overlap removed is rendered by performing overlap processing in the present embodiment.

Reference numerals 161 and 162 in FIG. 8 respectively denote information included in a DL, with 161 denoting gradation transparency information that is overlapped with a bitmap. Reference numeral 162 denotes bitmap information that is overlapped with transparency information.

Based on the transparency information 161, at the width and height included in the DL, a bitmap 163 that expresses a transparency per pixel is generated such that a color included in fill information changes to a color (in this case, a transparency value). In FIG. 8, black has a transparency of 0%, and white has a transparency of 100%. A bitmap 164 of an object image is generated based on the bitmap information 162. With respect to the bitmap 163 that expresses transparency and the bitmap 164 of the object image, overlap calculation is performed for each pixel based on the overlapping information included in the transparency information 161. As a result, a bitmap 165 with overlap removed is generated.

In this description, a bitmap and a gradation overlap, so bitmap rendering was performed for each. However, when solid fills without a gradation overlap, it is not necessary to render a bitmap, so overlap calculation of only one pixel is sufficient.

<CPU Relationship In PDL Processing/RIP Processing and Other Processing>

Figure 9:
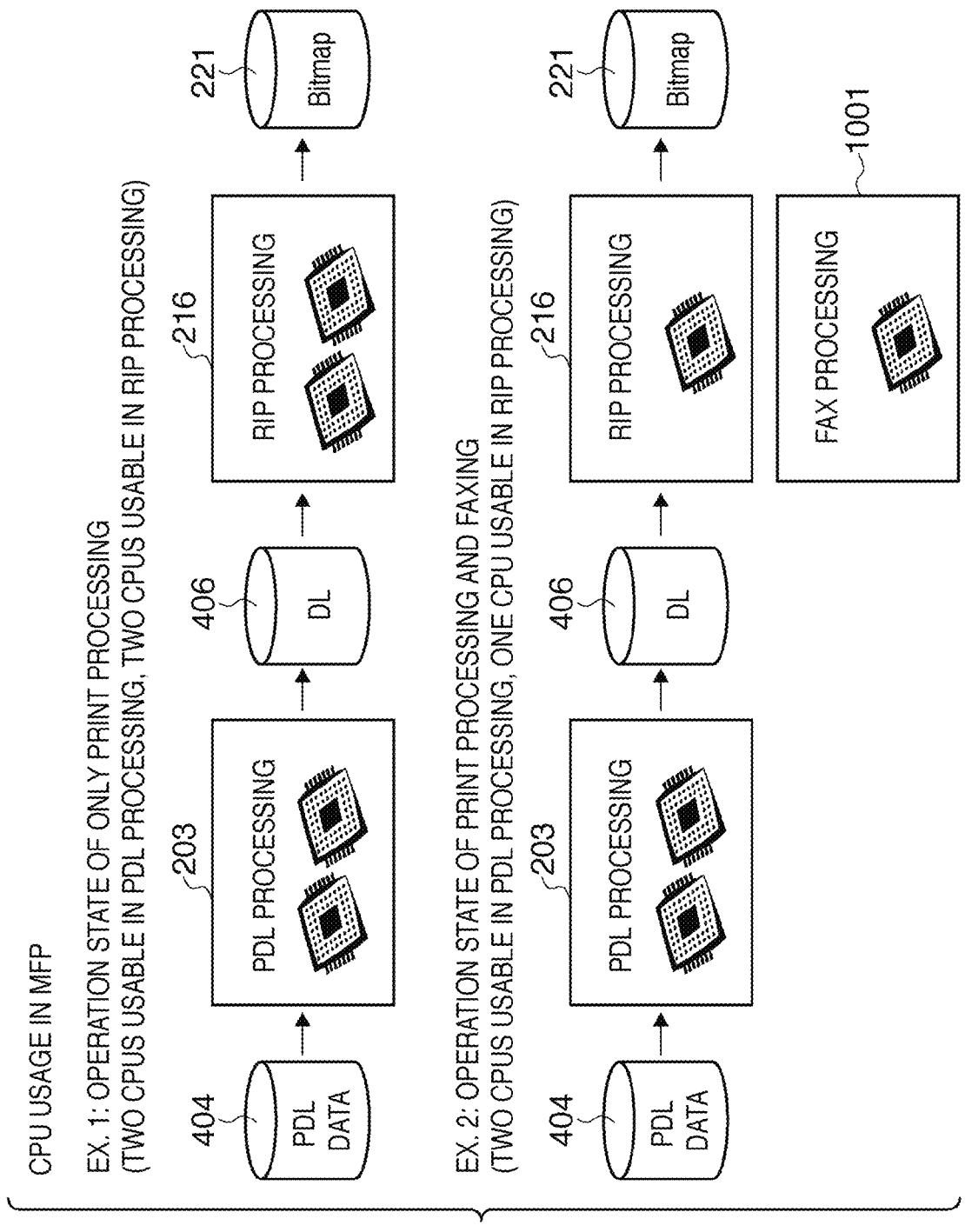
FIG. 9 illustrates the number of CPUs in Embodiment 1.

FIG. 9 shows an example of the number of CPUs used in PDL processing/RIP processing.

As described above, the print processing is divided among the PDL processing 203, which generates a DL from PDL data, and the RIP processing 216, which renders the DL to generate a bitmap. The number of CPUs assigned to perform each processing is determined by the system configuration, and in Example 1 in the upper part of FIG. 9, two CPUs are assigned to the PDL processing and two CPUs are assigned to the RIP processing.

Incidentally, in an MFP, it is conceivable that other than print processing, processing for copying, faxing, scanning, and so forth also operates in parallel. Therefore, it is conceivable that when print processing and other processing share the CPUs, as shown in the lower part of FIG. 9, of the two CPUs assigned to the RIP processing 216, one CPU is used for a fax processing 1001. As a result, it is conceivable that compared to Example 1 in the upper part of FIG. 9, in the lower Example 2, the capability of the RIP processing 216 is halved.

In this example, a change in the number of usable (capable of executing processing) CPUs occurs after RIP processing of a particular page ends and before PDL processing of another page is started, and it is not thought that the number of CPUs used changes between PDL processing and RIP processing of the same page. Also, in this example, in order to avoid complication it is assumed that the capability of each CPU is the same, so the CPU processing capability in PDL processing and RIP processing is affected merely by the number of CPUs.

However, the number of CPUs usable in each processing and which CPU to use when other processing operates is not limited to the above example. The number of such CPUs assigned is managed using a CPU number 206c of the RAM 206 by the CPU 205. Also, when the CPU processing capability is not the same, processing capability is judged based not only on the number of CPUs, but also on CPU capability. Furthermore, the capability of PDL processing and RIP processing is also affected by memory capacity or the like, so whether to perform overlap removal in PDL processing may be judged in consideration also of another parameter such as memory capacity.

<Specific Example of Judgment of Which DL to be Created>

Judgment of whether to generate a DL with overlap removed or a DL without overlap removed in PDL processing will be specifically described with reference to FIGS. 10 and 11.

This judgment is performed based on which processing can finish processing all of the data more quickly when data accumulated in the PDL processing waiting queue 404 and the RIP processing waiting queue 406 is processed by a usable CPU in the present PDL processing and RIP processing. When it is predicted that PDL processing will finish more quickly, such that the load of PDL processing becomes larger, an instruction is given to generate a DL with overlap removed from PDL data to be read out from the PDL processing waiting queue 404 and PDL-processed. On the other hand, when it is predicted that RIP processing will finish more quickly, such that the load of RIP processing becomes larger, an instruction is given to generate a DL without overlap removed from PDL data to be read out from the PDL processing waiting queue 404 and PDL-processed.

(Example Circumstances For Judging to Perform Overlap Removal)

Figure 10:
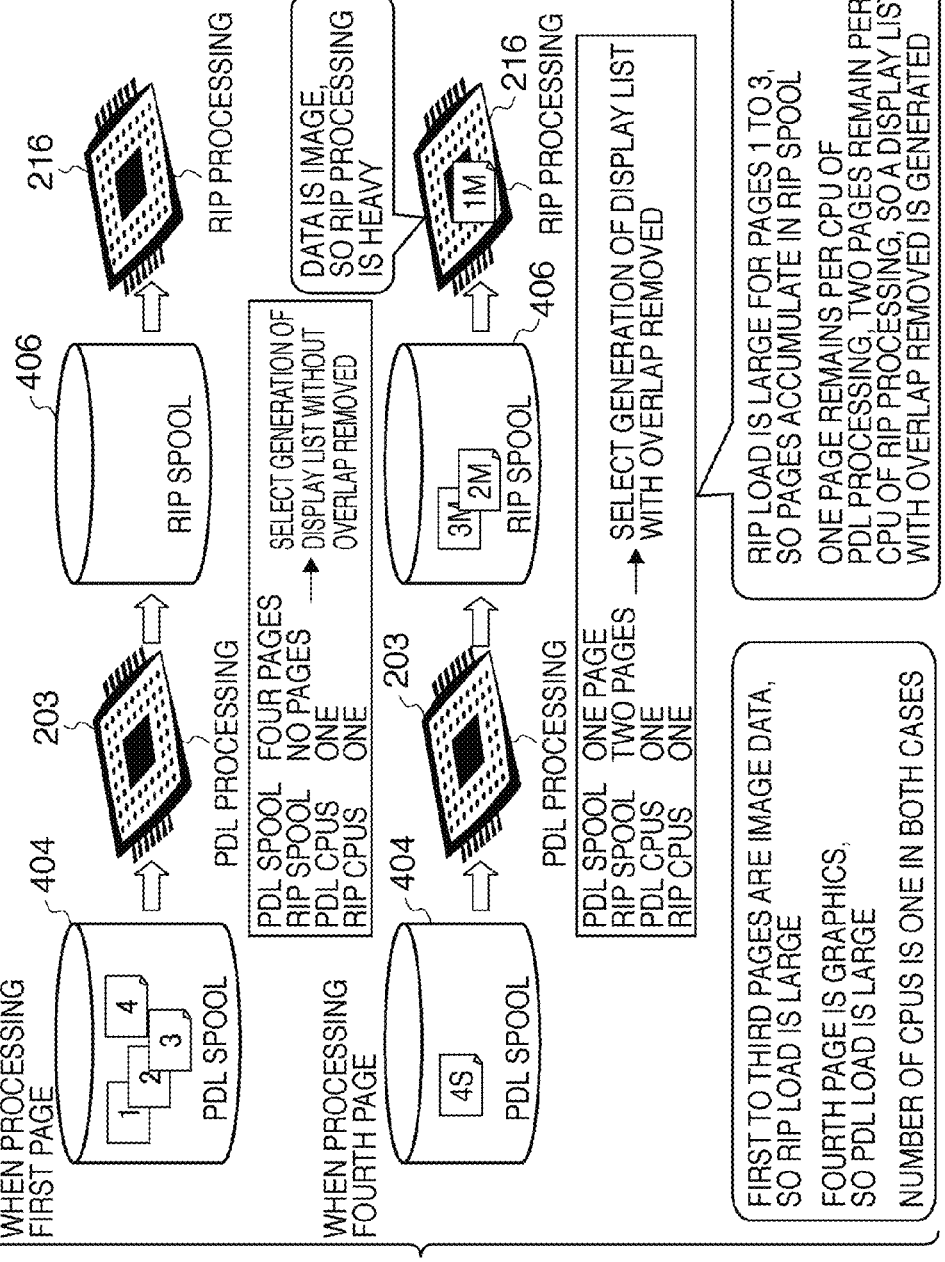
FIG. 10 shows an example of a criteria for selecting to create a display list without overlap removed or to create a display list with overlap removed, when the number of CPUs is the same as in Embodiment 1.

FIG. 10 shows an example in which one CPU is assigned to each of PDL processing and RIP processing, and in printing of four pages, pages 1 to 3 are image data, and page 4 is graphic data. In FIG. 10, "S" indicates processing data with overlap removed, and "M" indicates processing data without overlap removed.

In this example, the number of CPUs is the same, so the processing load is simply judged to be larger for the processing having more data accumulated in the queue. As a result, when PDL processing for the first page starts, the load is larger for PDL processing, so as shown in the upper part of FIG. 10, an instruction is given to generate a DL without overlap removed, which has a lighter PDL processing load. Generation of a DL without overlap removed is likewise instructed for pages 1 to 3.

When PDL processing starts for the fourth page, as shown in the lower part of FIG. 10, although the first page is processed by the RIP processing unit 216, a DL without overlap removed (1M) is generated so the load of the RIP processing unit 216 is larger. Therefore, DLs without overlap removed (2M and 3M) that have already been generated by the PDL processing unit 203 are spooled in the RIP processing waiting queue 406.

Here, a judgment is made of whether or not to perform overlap removal in the PDL processing of the fourth page. Because the fourth page is graphic data, the load of the PDL processing unit 203 is predicted to be quite large if level processing is performed. However, the RIP processing unit 216 is presently performing rendering to bitmap data for the first page, and furthermore two DLs without overlap removed (2M and 3M) are queued in the RIP processing waiting queue 406. The processing capability of the PDL processing unit 203 and the RIP processing unit 216 is the same when considered from the number of CPUs, so the load of the RIP processing unit 216 is judged to be larger.

As a result, an instruction is given to perform overlap removal in the fourth page of PDL processing. Note that this example judgment, as described above, can change according to CPU capability or other conditions (for example, such as memory capacity). Also, when there is a difference in the processing speed, amount of memory used, or the like when overlap removal (level processing) is performed in PDL processing or is performed in RIP processing, these can also be a judgment condition.

(Example Circumstances For Judging to Not Perform Overlap Removal)

Figure 11:
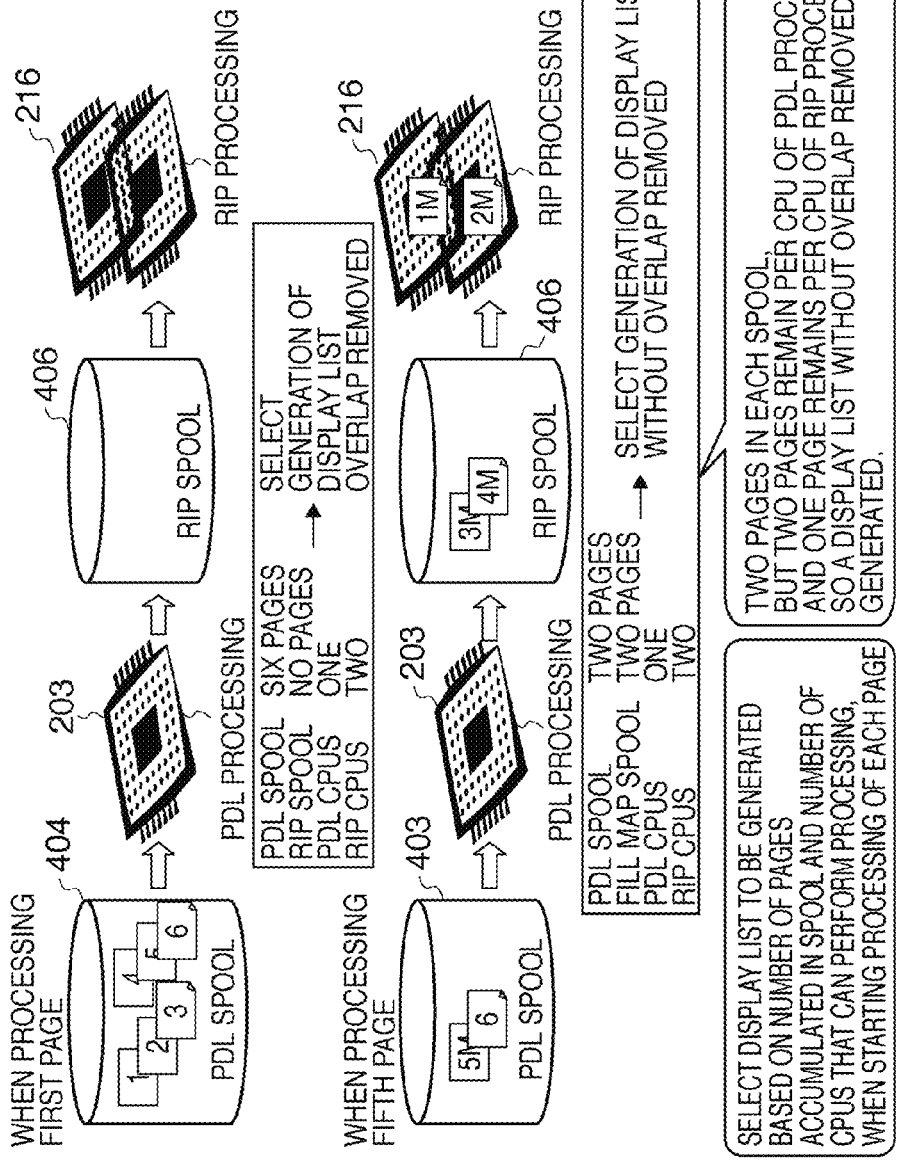
FIG. 11 shows an example of a criteria for selecting to create a display list without overlap removed or to create a display list with overlap removed, when the number of CPUs is different from that in Embodiment 1.

FIG. 11 shows an example in which one CPU is assigned to the PDL processing, two CPUs are assigned to the RIP processing, and six pages are printed without a change in attributes. In FIG. 11, "S" indicates processing data with overlap removed, and "M" indicates processing data without overlap removed.

First, when PDL processing starts for the first page, the load for PDL processing is large, so as shown in the upper part of FIG. 11, an instruction is given to generate a DL without overlap removed, which has a light PDL processing load. Generation of a DL without overlap removed is likewise instructed for pages 1 to 4.

When PDL processing starts for the fifth page, as shown in the lower part of FIG. 11, two pages, that is, pages 5 and 6, are queued in the PDL processing waiting queue 403. On the other hand, the number of pages accumulated in the RIP processing waiting queue 406 are DLs without overlap removed (3M and 4M). Accordingly, the processing loads are the same judging from only the number of pages, but twice as many CPUs can be used for RIP processing as for PDL processing, so processing capability is also twice as good. Accordingly, two pages of PDL processing are performed per CPU, and one page of RIP processing is performed per CPU, so a judgment is made that the load is greater for PDL processing. As a result, the PDL processing unit 203 is instructed to generate a DL without overlap removed, which has a light load.

Note that in the present example, the condition is simplified to the number of queued items and the number of CPUs, without considering differences in CPU capability, differences in the rendering load of a DL without overlap removed and a DL with overlap removed, and so forth.

<Example Processing Procedure of Embodiment 1>

The processing procedure of load balancing of PDL processing and RIP processing in Embodiment 1 will be described with reference to the flowcharts in FIGS. 12A to 12C.

(Instructing Whether to Perform Overlap Removal in PDL Processing by CPU 205)

Figure 12A:
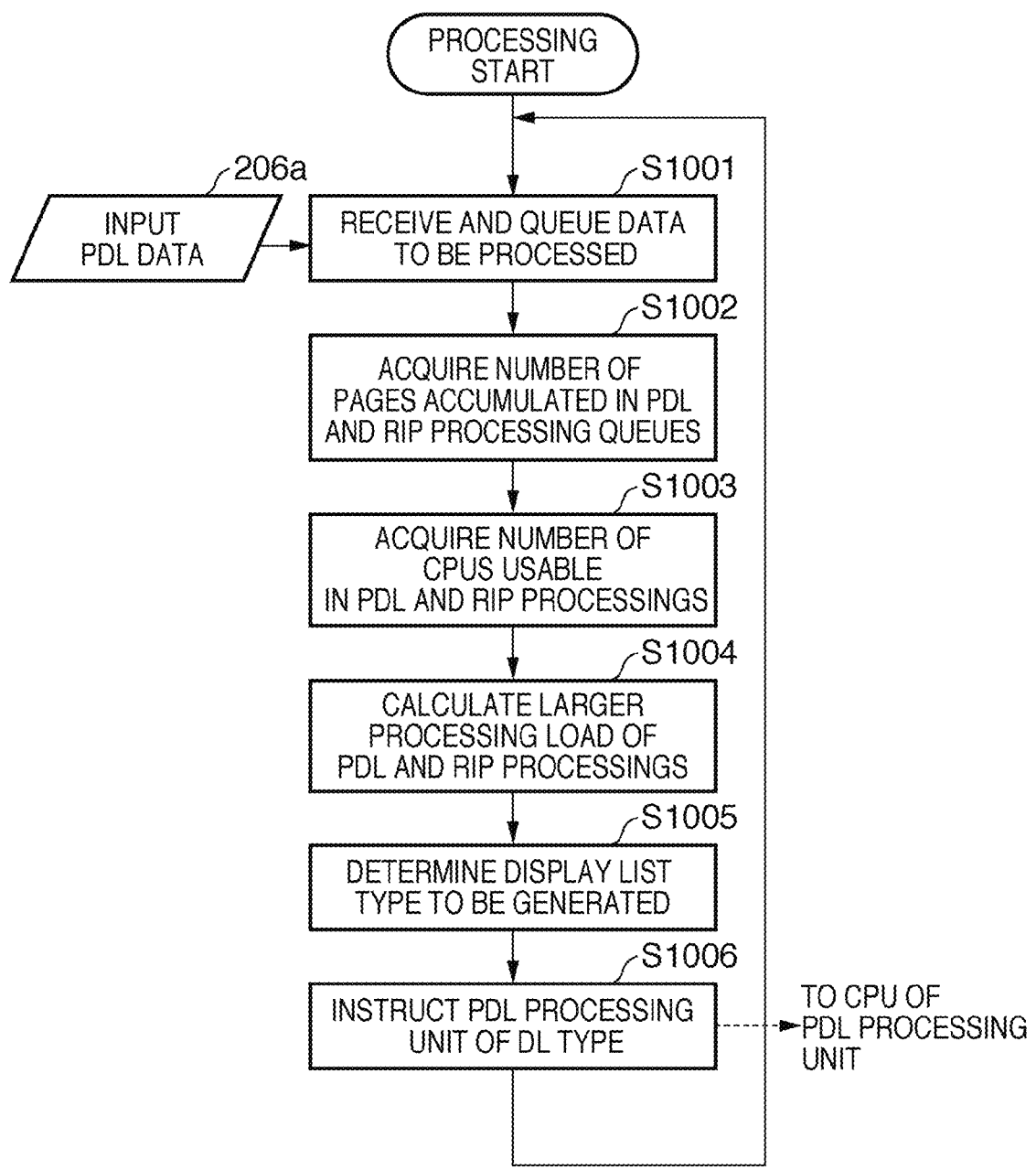
FIG. 12A is a flowchart that shows an example of a processing procedure of a CPU 205 in Embodiment 1.

FIG. 12A is a flowchart that shows an example processing procedure for instructing whether to perform overlap removal in PDL processing executed by the CPU 205.

In Step S1001, the CPU 205 waits for PDL data, receives PDL data 206a that has been received, and queues that data in the PDL processing waiting queue 404. Next, in Step S1002, the CPU 205 acquires the number of pages of data accumulated in the PDL processing waiting queue 404 and the RIP processing waiting queue 406 at the time when DL generation is started in the PDL processing unit 203. Next, in Step S1003, the CPU 205 acquires the number of CPUs that can be used respectively for PDL processing and RIP processing at the time when DL generation is started. Next, in Step S1004, the CPU 205, based on the data acquired in Steps S1002 and S1003, determines the processing with a larger load at that time from the PDL processing and the RIP processing. The above-described acquisition of the number of pages of data and acquisition of the number of CPUs is referred to as a first acquisition.

Next, in Step S1005, based on the determination of Step S1004, the CPU 205 determines whether to generate a DL without overlap removed or a DL with overlap removed. Next, in Step S1006, the CPU 205 instructs the PDL processing unit 203 regarding the DL type (in FIG. 4, the overlap removal-process flag: a DL without overlap removed or a DL with overlap removed) of a DL generated from PDL data to be PDL-processed hereafter.

In FIG. 12A, in order to avoid complication, the timing when DL generation is started in the PDL processing unit 203 is not clearly shown. Actually, queuing to the PDL processing waiting queue 404 and the start of DL generation in the PDL processing unit 203 are not synchronized. This non-synchronized processing can be easily modified from FIG. 12A.

(Processing by CPU of PDL Processing Unit)

Figure 12B:
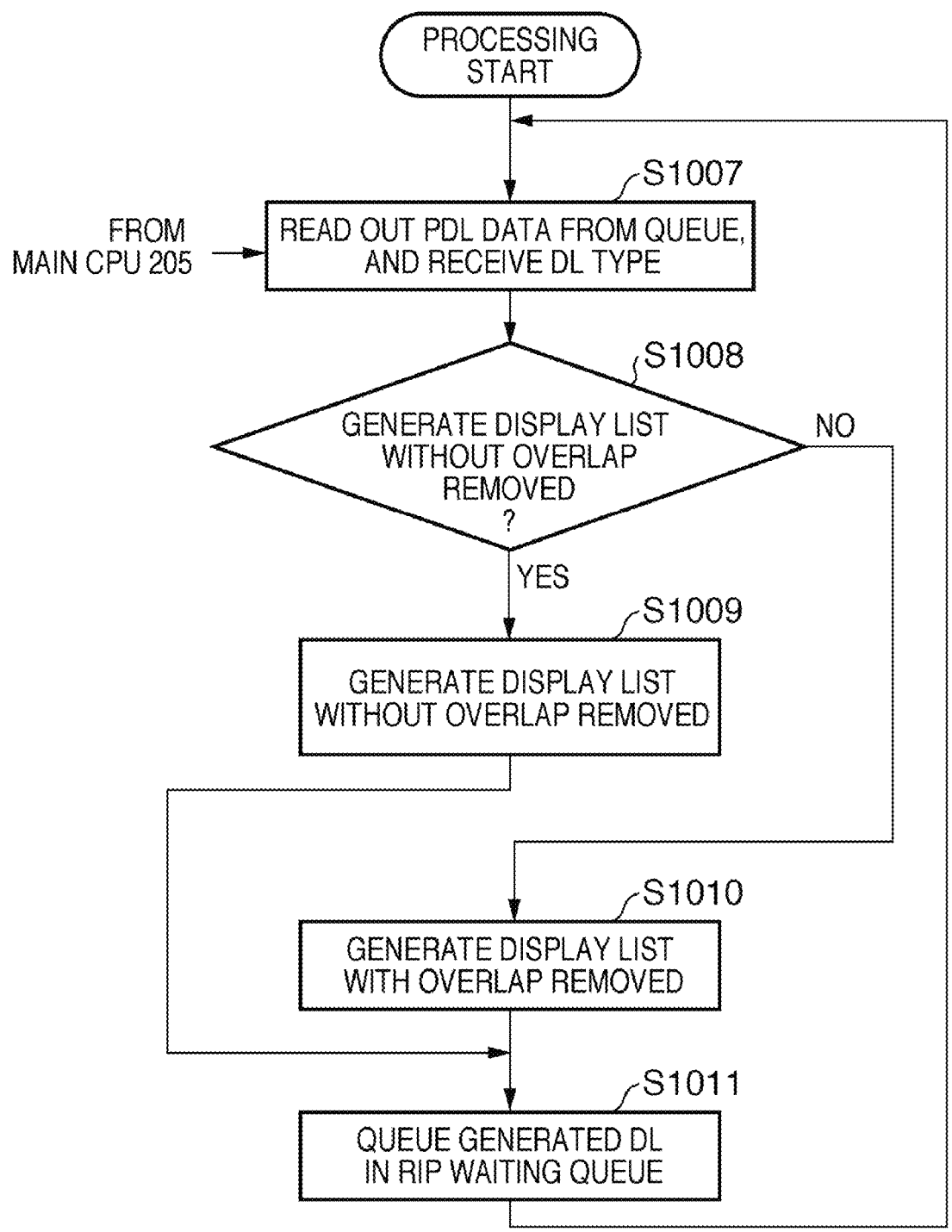
FIG. 12B is a flowchart that shows an example of a processing procedure of a CPU of a PDL processing unit in Embodiment 1.

FIG. 12B is a flowchart that shows an example procedure of processing executed by a CPU of the PDL processing unit.

First, in Step S1007, the CPU of the PDL processing unit reads out the first PDL data from the PDL processing waiting queue 404 and receives a DL type from the CPU 205. Next, in Step S1008, the CPU of the PDL processing unit, based on the DL type, judges whether to generate a DL without overlap removed or a DL with overlap removed.

In the case of generating a DL without overlap removed (Yes in S1008), the CPU of the PDL processing unit generates a DL without overlap removed in S1009. On the other hand, in the case of generating a DL with overlap removed (No in S1008), the CPU of the PDL processing unit generates a DL with overlap removed in S1010. In Step S1011, the CPU of the PDL processing unit queues the generated DL in the RIP processing waiting queue 406.

(Processing by CPU of RIP Processing Unit)

Figure 12C:
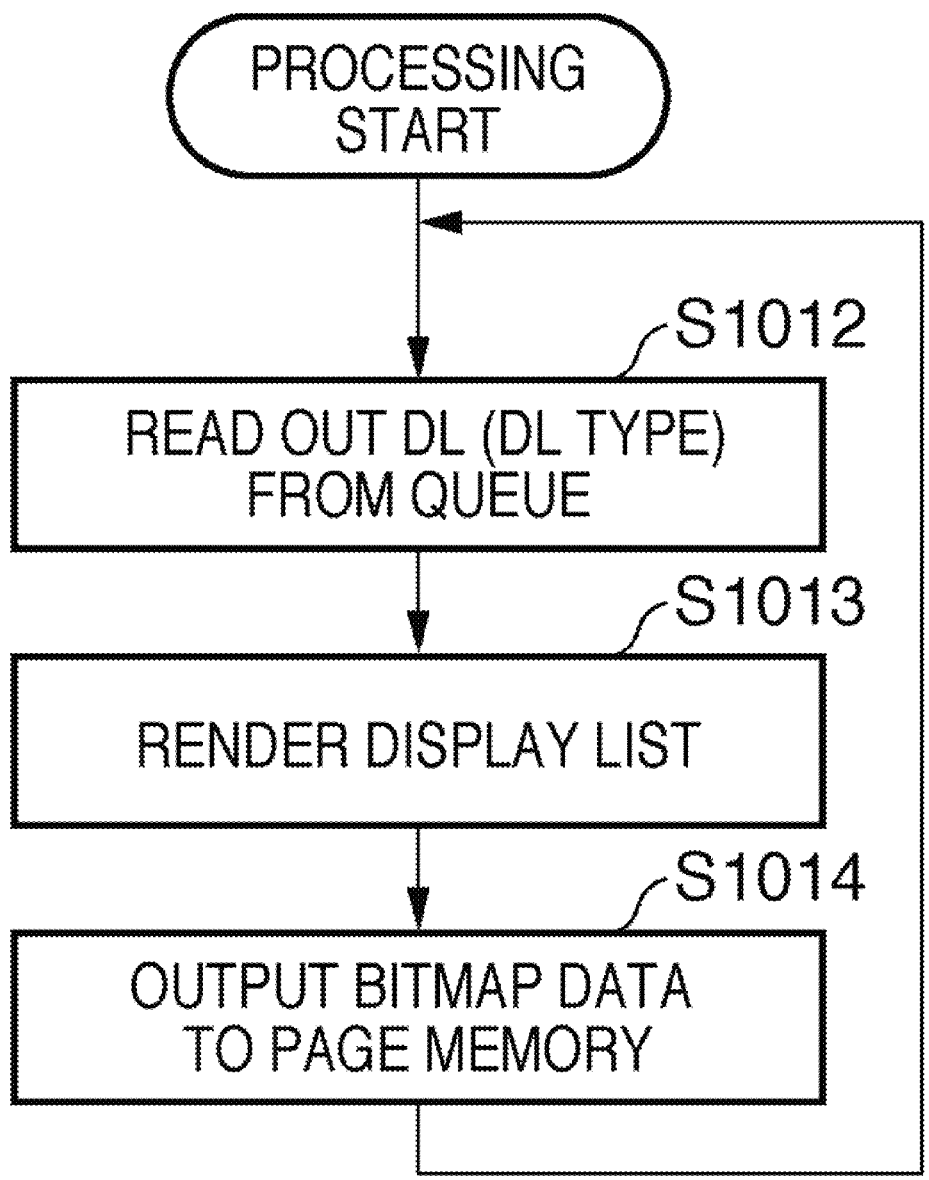
FIG. 12C is a flowchart that shows an example of a processing procedure of a CPU of a RIP processing unit in Embodiment 1.

FIG. 12C is a flowchart that shows an example procedure of processing executed by a CPU of the RIP processing unit.

First, in Step S1012, the CPU of the RIP processing unit reads out the first DL and a DL type from the RIP processing waiting queue 406. Next, in Step S1013, the CPU of the RIP processing unit performs DL rendering according to the DL type based on the DL that was read out. In Step S1014, the CPU of the RIP processing unit outputs bitmap data that was rendered in Step S1013 to the page memory 221.

Working Effects of Embodiment 1

Reduction of Memory Usage Amount

In the conventional example of Japanese Patent Laid-Open No. 2005-63027 and so forth, a memory area where data is held when performing PDL processing is necessary for each processor (CPU), but according to the present embodiment, only one area where data is held when performing PDL processing is necessary. That is, as in the present embodiment, by switching whether to perform overlap removal in PDL processing or RIP processing (balancing the load in a level), the memory usage amount is reduced.

(Reduction of CPU Load)

In the conventional example of Japanese Patent Laid-Open No. 2005-63027 and so forth, interpreter processing of the same PDL data is performed in parallel by a plurality of processors, so unnecessary processing (empty drawing of a page in which drawing is not performed as a result: PDL processing is also performed) occurs. However, in the present embodiment, in any case PDL processing is only performed once, and it is calculation speed or the like that changes according to the number of CPUs, so the CPU load is reduced.

(Improvement of Processing Speed by Load Balancing)

Figure 13B:
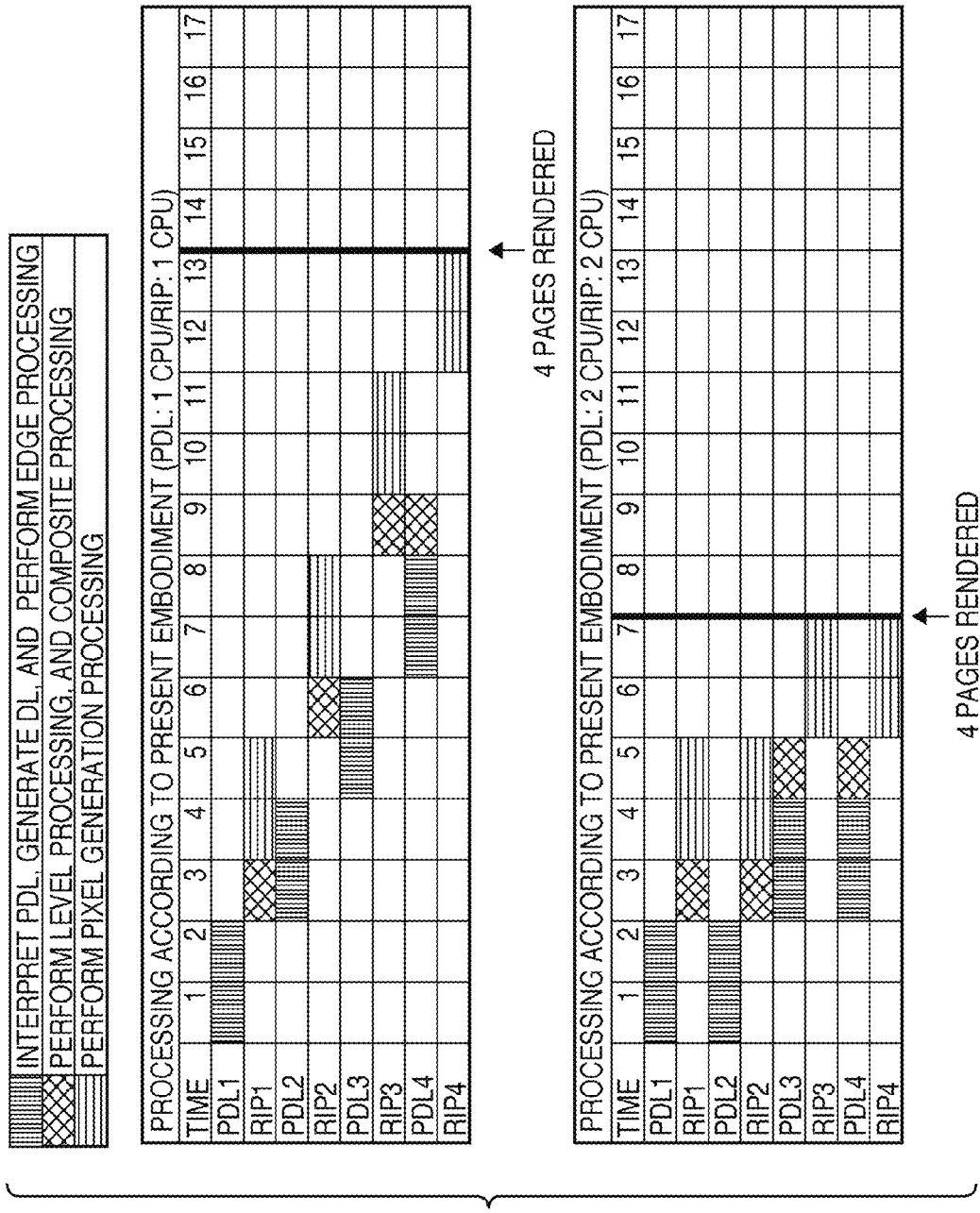
FIG. 13B shows an example of pipeline processing of PDL processing and RIP processing when the load balancing method of Embodiment 1 is applied.

FIG. 13A shows the processing speed of bitmap data rendering for the case of switching between bitmap rendering and empty drawing (upper table), and for the case of processing by fixing PDL processing and RIP processing (lower two tables), in Japanese Patent Laid-Open No. 2005-63027). FIG. 13B shows the processing speed of bitmap data rendering for the case of distribution of overlap removal processing when one CPU is assigned to each type of processing (upper table), and for the case of distribution of overlap removal processing when two CPUs are assigned to each type of processing (lower table), in the present embodiment.

In FIGS. 13A and 13B, for the sake of comparison, an example is shown in which four pages of data with the same attributes are processed, and in which it is assumed that one page of processing includes five frames (specifically, two frames of PDL processing, one frame of level processing or the like, and two frames of RIP processing).

The upper table in FIG. 13A shows processing according to Japanese Patent Laid-Open No. 10-52950, which is a conventional technique. In this example, there are three (P1 to P3) CPUs (processors), and each processor selects bitmap rendering or an empty drawing (assuming only PDL processing) in which only vector information is generated, and performs parallel processing.

Each processor selects between five frames of bitmap rendering or only two frames of PDL processing, only the processor that initially started processing of a page to be processed performs five frames of bitmap rendering, and the other processors move to processing of the next page by only performing two frames of PDL processing. The time in which bitmap rendering of four pages is performed in this processing procedure corresponds to a time of 14 frames.

Among the two lower tables in FIG. 13A, the center table shows an example in which processing is fixed so as to generate a DL with overlap removed in PDL processing, and bottom table shows an example in which processing is fixed so as to generate a DL without overlap removed in PDL processing. In this example, as in the present embodiment, overlap removal processing (level processing and composite processing) is not distributed among PDL processing and RIP processing in the midst of processing.

In both cases, parallel processing by the PDL processing unit and the RIP processing unit is only performed for two of the five frames, and together a time of 14 frames is necessary for bitmap rendering.

On the other hand, FIG. 13B shows the time necessary for four pages of bitmap rendering by a method for controlling whether to perform overlap removal according to the present embodiment in the PDL processing unit or the RIP processing unit.

The upper table in FIG. 13B shows an example in which one CPU is assigned to each of the PDL processing unit and the RIP processing unit, and the lower table in FIG. 13B shows an example in which two CPUs are assigned to each of the PDL processing unit and the RIP processing unit.

In the upper table in FIG. 13B, a DL without overlap removed is generated in the PDL processing unit for pages 1 to 3, but because the load of the RIP processing unit becomes large, a DL with overlap removed is generated in the PDL processing unit for page 4. As a result, overlap removal is performed in parallel in both the PDL processing unit and the RIP processing unit in 9 frames, so bitmap rendering of four pages ends in a time of 13 frames.

In the lower table in FIG. 13B, a DL without overlap removed is generated in the PDL processing unit for pages 1 and 2, but because the load of the RIP processing unit becomes large, a DL with overlap removed is generated in the PDL processing unit for pages 3 and 4. As a result, parallel processing is performed for overlap removal in the RIP processing unit of pages 1 and 2, and overlap removal in the PDL processing unit of pages 3 and 4, so bitmap rendering of four pages ends in a time of 7 frames.

Note that the examples shown in FIGS. 13A and 13B are simplified by assuming that the load is the same for PDL processing and RIP processing in processing of only four pages, so only a slight improvement is apparent. However, when considering an increase in the number of pages to be processed, a difference in the load of PDL processing and RIP processing, and so forth, a large improvement in the processing time of bitmap rendering is clear.

<Example Considering Average Processing Capability Per Page>

In above Embodiment 1, a judgment of whether to perform overlap removal in PDL processing was made based on the number of waiting items queued and the number of CPUs.

However, furthermore, the following processing is also possible when it is possible to acquire the average processing capability per page of PDL processing and RIP processing. Specifically, first, the average processing capability per page is acquired. Then, whether or not to perform overlap removal in PDL processing may be judged from the average processing capability per page of PDL and RIP processing, the number of items of data waiting in sequence for PDL processing and RIP processing, and the number of CPUs that are capable of processing. This acquisition of an average processing capability per page is referred to as a second acquisition.

For example, in the case of a print processing apparatus having a configuration in which CPUs with different processing capability (for example, a 500 MHz ARM CPU and a 3 GHz Intel CPU) are mixed, or the like, the processing time will differ greatly depending on which CPU has been assigned to which processing. As a method for making a judgment in this case, CPU capability is acquired prior to main processing and information is saved, and when the CPU that will perform PDL processing or RIP processing has been determined, processing capability is acquired from the saved information.

<Example Considering Queue Size>

The following processing is also possible in the case of differing size of the queue in which data for PDL processing and RIP processing accumulates. Specifically, first, the size of the queue in which data awaiting PDL processing can be accumulated and the size of the queue in which data awaiting RIP processing can be accumulated are acquired. Then, whether or not to perform overlap removal in PDL processing may be judged from the PDL processing queue size and the RIP processing queue size, the number of items of data waiting in sequence for PDL processing and RIP processing, and the number of CPUs that are capable of processing. This acquisition of queue size is referred to as a third acquisition.

Same as the above CPU capability, the speed at which the queue accumulates changes greatly differs according to the respective queue sizes for PDL processing and RIP processing, for example, between 256 Mbytes and 10 Mbytes (and when the queue becomes full, the preceding processing stops). As a method for making a judgment in this case, respective queue sizes are acquired prior to main processing and information is saved, and when performing PDL processing or RIP processing, the saved information is used to calculate the respective processing capability of PDL processing and RIP processing.

(Specific Example Considering CPU Processing Capability and Queue Size)

Following is a specific description of a judgment method in which CPU processing capability and queue size are considered.

First, preliminarily a point corresponding to capability is set (a lower point is set as the load increases).

Below is an example of a CPU processing capability table.

TABLE 1

| CPU Capability (clock frequency) | Point |
|---|---|
| 500 MHz or less | 0 |
| 500 MHz to 1 GHz | 1 |
| 1.1 GHz to 1.5 GHz | 2 |
| 1.6 GHz to 2 GHz | 3 |
| 2.1 GHz to 2.5 GHz | 4 |
| 2.6 GHz or more | 5 |

Next is an example of a queue size table.

TABLE 2

| Queue Size | Point |
|---|---|
| 10 Mbytes or less | 0 |
| 11 Mbytes to 20 Mbytes | 1 |
| 21 Mbytes to 30 Mbytes | 2 |
| 31 Mbytes to 40 Mbytes | 3 |
| 41 Mbytes to 50 Mbytes | 4 |
| 51 Mbytes or more | 5 |

Next, the capability when processing a particular page is scored.

Ex.: PDL processing by 1 GHz→1 point
RIP processing by 1.5 GHz 2→points
PDL queue of 20 Mbytes→1 point
RIP queue of 50 Mbytes→4 points Finally, the place where overlap removal will be performed is determined based on the score.

PDL processing=total 2 points (1+1=2)
RIP processing=total 6 points (2+4=6)

In this case, the load is lighter to RIP processing than PDL processing, so a determination is made to perform overlap removal on the RIP processing side.

Also, the capability when processing another page is scored.

Ex.: PDL processing by 1.5 GHz→2 points
RIP processing by 1 GHz→1 point
PDL queue of 40 Mbytes→3 points
RIP queue of 10 Mbytes→0 points Next, the place where overlap removal will be performed is determined based on the score.

PDL processing=total 5 points (2+3=5)
RIP processing=total 1 point (1+0=1)

In this case, the load is lighter to PDL processing than RIP processing, so a determination is made to perform overlap removal on the PDL processing side.

Two specific examples are given above, but this is not a limitation; it is clear that it is possible to assign overlap removal to processing whereby the load is even lighter.

[Modified Example of Embodiment 1]
<Example Processing Including DL With Overlap removed and DL Without Overlap removed in Arbitrary Ratio>

Next, as a modified example of the present embodiment, is a description of a DL that includes a DL with overlap removed and a DL without overlap removed in an arbitrary ratio, with reference to FIG. 14.

In the modified example of Embodiment 1, the size of the load of PDL processing and RIP processing is confirmed from the number of queued items remaining in the PDL processing waiting queue 404 and the RIP processing waiting queue 406, and the number of CPUs that can be used in the PDL processing unit 203 and the RIP processing unit 216. Here, for example, a circumstance is assumed in which the load of the PDL processing unit 203 is 70% and the load of the RIP processing unit 216 is 30%. In this case, when attempting to generate a DL whereby processing will be performed with a more balanced load, it is preferable to apply, inversely proportional to the load, a load of 30% to the PDL processing and a load of 70% to the RIP processing, rather than distributing 100% of the load to the PDL processing or the RIP processing, as in Embodiment 1.

In the example on the right side of FIG. 14, processing is performed such that in the generated DL, 30% of one page is an area with overlap removed and 70% is an area without overlap removed. When rendering is performed in the RIP processing unit, with reference to the DL, in the area without overlap removed, overlap processing is performed and the resulting fill is rendered, and in the area with overlap removed, the fill of that area is rendered without further processing.

<Working Effects of Modified Example of Embodiment 1>

According to this modified example of Embodiment 1, even in the example processing in FIG. 13B, overlap removal is distributed according to the load of the PDL processing unit and the RIP processing unit, so processing for bitmap rendering can be performed in a shorter time.

Embodiment 2

In Embodiment 1, switching between generation of a DL without overlap removed and a DL with overlap removed was performed in order to distribute the load of the PDL processing unit and the RIP processing unit. However, in Embodiment 2, an example is described in which generation of these DLs is switched from the viewpoint of real-time rendering or non-real-time rendering.

Real-time rendering means RIP processing in which the speed of RIP processing is synchronized with the speed at which the printer engine discharges paper. That is, a memory area for spooling data after RIP processing (below referred to as a spool memory: in this example, corresponds to the page memory 221) is not necessary. On the other hand, non-real-time rendering means RIP processing in which the speed of RIP processing is not synchronized with the speed at which the printer engine discharges paper. In this case, a memory area for spooling data after RIP processing is necessary.

In order to perform real-time rendering, RIP processing must follow the printer engine speed, so it is desirable that the RIP processing load is light. Therefore, a DL with overlap removed is appropriate for real-time rendering because this DL does not require overlap removal. On the other hand, in the MFP, it is conceivable to share a memory area with other processing in order to conserve memory usage. This is also true with respect to the above-described spool memory, so although the spool memory is ordinarily used for print processing of PDL data, in some circumstances other processing (for example, such as faxing or copying) may occupy the spool memory.

<Example Judgment Of Which DL To Create In Embodiment 2>

Based on the above presumptions, an example judgment of whether to create a DL without overlap removed or a DL with overlap removed in the case of Embodiment 2 will be described with reference to FIG. 15.

Figure 15:
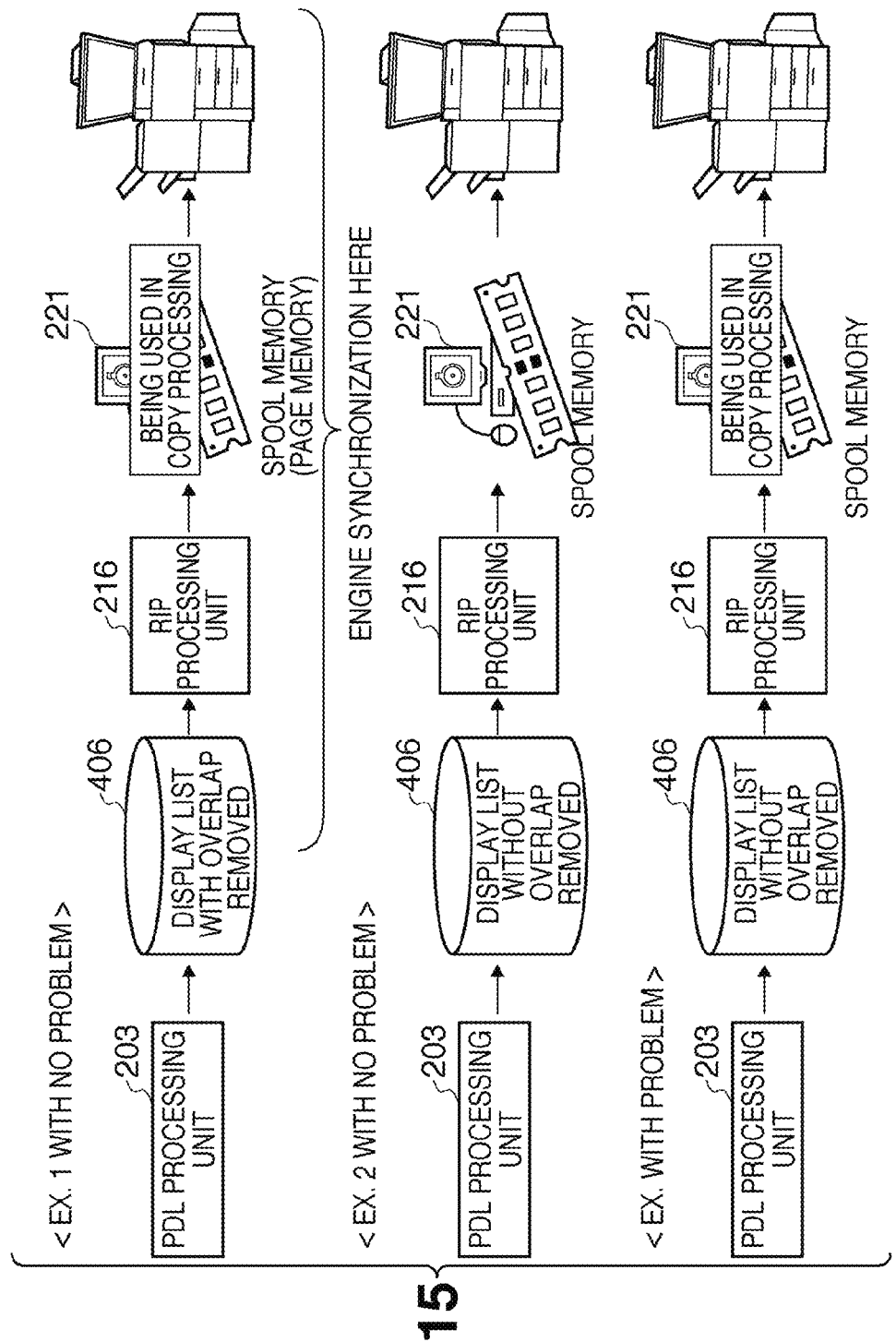
FIG. 15 shows, with respect to issues to be addressed in Embodiment 2, examples in which there is no problem and an example in which there is a problem.

In Example 1 in which there is no problem in the top row in FIG. 15, the spool memory is occupied by copy processing. However, because a DL with overlap removed was generated in PDL processing, real-time rendering is possible so the spool memory is not necessary, and therefore parallel operation with the copy processing is possible.

In Example 2 in which there is no problem in the middle row in FIG. 15, the spool memory is not used in other processing. Accordingly, there is no problem even when a DL without overlap removed is generated in PDL processing, and non-real-time rendering is performed so the spool memory is used in print processing.

On the other hand, in the example in which there is a problem in the bottom row in FIG. 15, although the spool memory is being used in copy processing, a DL without overlap removed, for which real-time rendering cannot be performed, is generated in PDL processing. Therefore, until the spool memory is released, waiting time in print processing occurs.

<Example Configuration of Image Processing Apparatus of Embodiment 2>

The configuration of the image processing apparatus in Embodiment 2 is basically the same as in Embodiment 1, so a repetitive description will be omitted.

However, in the functional configuration of image processing shown in FIG. 4, the condition for generation of the overlap removal-process flag by the PDL processing switching unit 403 is changed from the number of waiting items queued and the number of CPUs in Embodiment 1. That is, whether or not the spool memory (page memory 221) is currently dedicated to other processing (such as faxing or copying) becomes the condition for generation of the overlap removal-process flag. Also, in FIG. 5, a flag of whether or not the spool memory (page memory 221) is currently dedicated to other processing is held.

<Example Processing Procedure of Embodiment 2>

Figure 16:
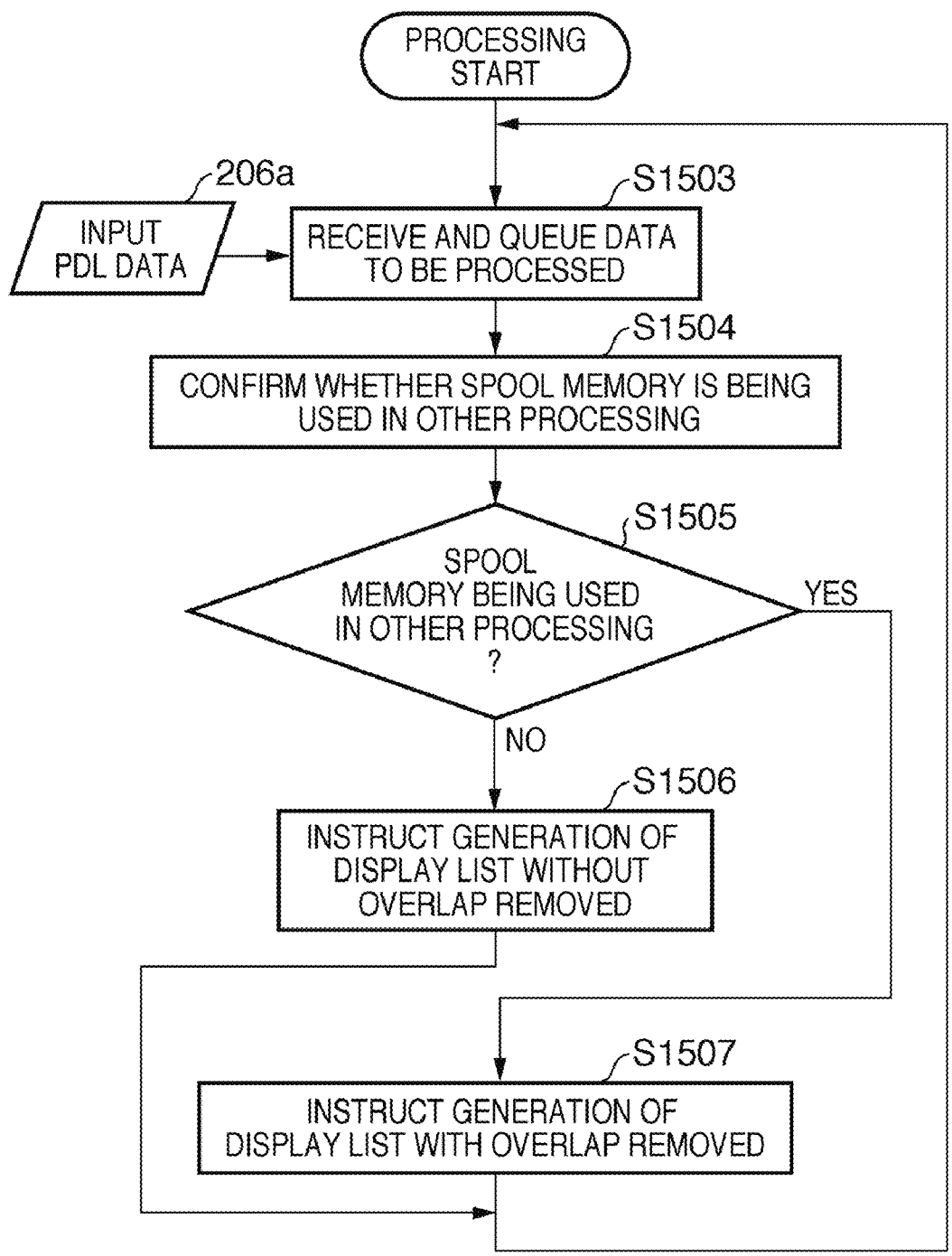
FIG. 16 is a flowchart that shows an example of a processing procedure of a CPU 205 in Embodiment 2.

Next is a description of a processing procedure for balancing the load of PDL processing and RIP processing in Embodiment 2, with reference to the flowchart in FIG. 16.

(Instructing Whether To Perform Overlap Removal in PDL Processing by CPU 205)

In Step S1503 in FIG. 16, the CPU 205 waits for PDL data, receives PDL data 206a that has been received, and queues that data in the PDL processing waiting queue 404. Next, in Step S1504, the CPU 205 confirms whether the spool memory is being used in other processing at the time when DL generation is started in the PDL processing unit 203.

Next, in Step S1505, the CPU 205 judges whether or not the spool memory is being used in other processing, and branches based on that judgment.

When the spool memory is not being used in other processing (Yes in S1505), it is not necessary to perform real-time rendering, so in Step S1506, the CPU 205 instructs the PDL processing unit 203 to generate a DL without overlap removed. When the spool memory is being used in other processing (No in S1505), it is necessary to perform real-time rendering, so in Step S1507, the CPU 205 instructs the PDL processing unit 203 to generate a DL with overlap removed.

(Processing by CPU of PDL Processing Unit and RIP Processing Unit)

Below, processing by a CPU of the PDL processing unit and the RIP processing unit is the same as in FIGS. 12B and 12C, so a duplicate description is omitted.

>Working Effects of Embodiment 2≦

With the processing in Embodiment 2, printer errors (print data short error) due to loss of synchronization of RIP processing rendering with operation of the printer engine is eliminated, so efficient printing is possible.

Other Embodiments

In the Embodiments 1 and 2, the processing is independent, but by combining Embodiments 1 and 2 it is possible to more effectively use resources and further shorten processing time. Also, in Embodiment 1, whether or not to perform DL overlap removal processing is controlled according to the number of queued items (load amount) and the number of CPUs (processing capability), and in Embodiment 2, whether or not to perform DL overlap removal processing is controlled according to whether or not there is empty space in the spool memory. However, this is not a limitation; the present invention also encompasses a configuration in which whether or not to perform DL overlap removal processing is controlled according to another condition.

Above, various embodiments were described in detail, but the present invention may also be applied to a system configured from a plurality of devices, or may be applied to an apparatus configured from one device. For example, the present invention may be applied to a scanner, a printer, a PC, a copier, a multifunction peripheral, a facsimile apparatus, or the like.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-293938 filed Nov. 17, 2008, which is hereby incorporated by reference herein in its entirety.

What is claimed is:

1. An image processing method of generating a display list from PDL data described in a page description language (PDL), and generating bitmap data by rendering the display list, the method comprising:
   a determining step of, before starting PDL processing in which the display list is generated from PDL data, determining whether to generate a display list with overlap removed or a display list without overlap removed in the PDL processing to balance a load of the PDL processing and a load of RIP processing in which the bitmap data is generated by rendering the display list;
   a first bitmap data rendering step of, in a case where it is determined to generate a display list without overlap removed in said determination step, generating a display list without overlap removed in the PDL processing and generating bitmap data based on the display list without overlap removed in the RIP processing; and
   a second bitmap data rendering step of, in a case where it is determined to generate a display list with overlap removed in said determination step, generating a display list with overlap removed in the PDL processing and generating bitmap data based on the display list with overlap removed in the RIP processing,
   wherein overlap removal includes level processing in which a plurality of items of data are sorted in order from highest level to lowest level and unnecessary data, hidden by data in a higher level, is removed based on level information associated with a portion to be filled put between intersection points of objects, and composite processing in which a plurality of portions to be filled are converted into one portion to be filled based on overlapping information associated with portions to be filled for which sorting has ended.

2. The image processing method according to claim 1, wherein in said determining step, based on a prediction of the load on the PDL processing and a prediction of the load on the RIP processing, it is determined that a display list with overlap removed is generated in the PDL processing in a case where the prediction of the load on the RIP processing is larger than that on the PDL processing, and it is determined that the display list without overlap removed is generated in the PDL processing in a case where the prediction of the load on the PDL processing is larger than that on the RIP processing.

3. The image processing method according to claim 2, further comprising a first acquisition step of acquiring a number of items of data waiting for PDL processing and RIP processing and a number of CPUs capable of executing the PDL processing and RIP processing,
   wherein the loads on the PDL processing and RIP processing are respectively predicted based on the number of items of data waiting for each processing and the number of CPUs capable of executing each processing.

4. The image processing method according to claim 3, further comprising a second acquisition step of acquiring an average processing capability per page, in a case where it is possible to acquire the average processing capability per page of the PDL processing and RIP processing,
   wherein the loads on the PDL processing and RIP processing are respectively predicted based on the average processing capability per page of the PDL processing and RIP processing, the number of items of data waiting for each processing, and the number of CPUs capable of executing each processing.

5. The image processing method according to claim 3, further comprising a third acquisition step of acquiring a size of a queue in which data awaiting the PDL processing is accumulated and a size of another queue in which data awaiting the RIP processing is accumulated, in a case where the size of the queue is different the size of the another queue,
- wherein the loads on the PDL processing and RIP processing are respectively predicted based on the sizes of the queue for PDL processing and the another queue for RIP processing, the number of items of data waiting for each processing, and the number of CPUs capable of executing each processing.

6. The image processing method according to claim 1, wherein in said determining step, it is determined that a display list is generated which includes a portion with overlap removed and a portion without overlap removed in a ratio inversely proportional to a ratio of the loads on the PDL processing and the RIP processing.

7. The image processing method according to claim 1, wherein in said determining step, based on whether or not a spool memory in which bitmap data generated by the RIP processing is spooled can be used, it is determined to generate the display list with overlap removed in the PDL processing in a case where the spool memory cannot be used, and it is determined to generate the display list without overlap removed in a case where the spool memory can be used.

8. The image processing method according to claim 7, wherein in said determination step, it is judged that the spool memory cannot be used in a case where the spool memory is used by other processing.

9. A non-transitory computer-readable storage medium which stores a program of causing a computer to execute steps of the image processing method according to claim 1.

10. An image processing apparatus for generating a display list from PDL data described in a page description language (PDL), and generating bitmap data by rendering the display list, the apparatus comprising:
- a first bitmap data rendering unit configured to generate a display list without overlap removed in PDL processing in which a display list is generated from the PDL data, and generate bitmap data based on the display list without overlap removed in RIP processing in which bitmap data is generated by rendering the display list;
- a second bitmap data rendering unit configured to generate a display list with overlap removed in the PDL processing, and generate bitmap data based on the display list with overlap removed in the RIP processing; and
- a determining unit configured to, before starting the PDL processing on the PDL data, determine whether to generate the display list with overlap removed or the display list without overlap removed in the PDL processing to balance a load of the PDL processing and a load of the RIP processing,
- wherein overlap removal includes level processing in which a plurality of items of data are sorted in a order from highest level to lowest level and unnecessary data, hidden by data in a higher level, is removed based on level information associated with a portion to be filled put between intersection points of objects, and composite processing in which a plurality of portions to be filled are converted into one portion to be filled based on overlapping information associated with portions to be filled for which sorting has ended.

11. The image processing apparatus according to claim 10, wherein said determining unit, based on a prediction of the load on the PDL processing and a prediction of the load on the RIP processing, determines to generate a display list with overlap removed in the PDL processing in a case where the prediction of the load on the RIP processing is larger than that on the PDL processing, and determines to generate the display list without overlap removed in the PDL processing in a case where the prediction of the load on the PDL processing is larger than that on the RIP processing.

12. The image processing apparatus according to claim 11, further comprising a first acquisition unit configured to acquire a number of items of data waiting for PDL processing and RIP processing and a number of CPUs capable of executing the PDL processing and RIP processing,
- wherein the loads on the PDL processing and RIP processing are respectively predicted based on the number of items of data waiting for each processing and the number of CPUs capable of executing each processing.

13. The image processing apparatus according to claim 12, further comprising a second acquisition unit configured to acquire an average processing capability per page, in a case where it is possible to acquire the average processing capability per page of the PDL processing and RIP processing,
- wherein the loads on the PDL processing and RIP processing are respectively predicted based on the average processing capability per page of the PDL processing and RIP processing, the number of items of data waiting for each processing, and the number of CPUs capable of executing each processing.

14. The image processing apparatus according to claim 12, further comprising a third acquisition unit configured to acquire a size of a queue in which data awaiting the PDL processing is accumulated and a size of another queue in which data awaiting the RIP processing is accumulated, in a case where the size of the queue is different the size of the another queue,
- wherein the loads on the PDL processing and RIP processing are respectively predicted based on the sizes of the queue for PDL processing and the another queue for RIP processing, the number of items of data waiting for each processing, and the number of CPUs capable of executing each processing.

15. The image processing apparatus according to claim 10, wherein said determining unit determines to generate a display list which includes a portion with overlap removed and a portion without overlap removed in a ratio inversely proportional to a ratio of the loads on the PDL processing and the RIP processing.

16. The image processing apparatus according to claim 10, further comprising a spool memory in which bitmap data generated by the RIP processing is spooled,
- wherein said determining unit, based on whether or not the spool memory can be used, it is determined to generate the display list with overlap removed in the PDL processing in a case where the spool memory cannot be used, and it is determined to generate the display list without overlap removed in a case where the spool memory can be used.

17. The image processing apparatus according to claim 16, wherein said determination unit judges that the spool memory cannot be used in a case where the spool memory is used by other processing.

18. An image forming apparatus that includes the image processing apparatus according to claim 10, and forms an image represented by the bitmap data generated by the RIP processing.

19. An image processing apparatus comprising:
- a PDL processing unit configured to generate a display list from PDL data described in a page description language (PDL); and a RIP processing unit configured to generate bitmap data by rendering the display list generated by said PDL processing unit, wherein it is determined whether said PDL processing unit generates a display list with overlap removed or a display list without overlap removed in accordance with a capability of said PDL processing unit, a capability of said RIP processing unit and an awaiting state of said RIP processing unit, said RIP processing unit generates bitmap data based on the display list without overlap removed in a case where said PDL processing unit generates a display list without overlap removed, and said RIP processing unit generates bitmap data based on the display list with overlap removed in a case where said PDL processing unit generates a display list with overlap removed.

* * * * *